US007585221B2

(12) United States Patent
Singer et al.

(10) Patent No.: US 7,585,221 B2
(45) Date of Patent: Sep. 8, 2009

(54) SLOT MACHINE GAME HAVING A PLURALITY OF WAYS FOR A USER TO OBTAIN PAYOUTS FOR ONE OR MORE ADDITIONAL PAY LINES FORMED BY THE APPEARANCE OF SPECIAL SYMBOLS IN A SYMBOL MATRIX

(75) Inventors: Anthony M. Singer, Ringwood, NJ (US); Daniel M. Marks, Nyack, NY (US); Howard Marks, Ilrnington, NY (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 12/175,111

(22) Filed: Jul. 17, 2008

(65) Prior Publication Data

US 2008/0274789 A1 Nov. 6, 2008

Related U.S. Application Data

(63) Continuation of application No. 10/371,016, filed on Feb. 20, 2003, now Pat. No. 7,494,413.

(60) Provisional application No. 60/357,637, filed on Feb. 20, 2002.

(51) Int. Cl.
*G06F 17/00* (2006.01)

(52) U.S. Cl. ........................................................ 463/20

(58) Field of Classification Search .............. 463/16–25
See application file for complete search history.

(56) References Cited

U.S. PATENT DOCUMENTS 4,198,052 A 4/1980 Gauselmann
4,448,419 A 5/1984 Telnaes
4,618,150 A 10/1986 Kimura (Continued)

FOREIGN PATENT DOCUMENTS

AU 1997 17601 B2 9/1997

(Continued)

OTHER PUBLICATIONS

Addams Family —Cousin It's Hair Day Advertisement, written by IGT, published Mar. 2004.

(Continued)

*Primary Examiner*—Ronald Laneau
(74) *Attorney, Agent, or Firm*—K & L Gates LLP

(57) ABSTRACT

A gaming device including a plurality of reels having a plurality of symbols. The symbols include at least one bonus payline symbol. In a game, the gaming device or player spins the reels to indicate symbols on the reels. After the reel stops spinning, the gaming device evaluates the symbols indicated on the paylines associated with the reels to determine if any winning symbol combinations are indicated on the paylines. The gaming device provides an award associated with any winning symbol combinations indicated on the paylines. The gaming device then forms at least one bonus payline with any bonus payline symbols indicated on the reels and evaluates the symbols indicated on the bonus payline to determine if the bonus payline indicates any winning symbol combinations. A bonus award associated with any winning symbol combinations is provided to the player.

38 Claims, 16 Drawing Sheets

U.S. PATENT DOCUMENTS 4,624,459 A 11/1986 Kaufman
4,679,143 A 7/1987 Hagiwara
4,695,053 A 9/1987 Vazquez, Jr. et al.
4,711,451 A 12/1987 Pajak et al.
4,732,386 A 3/1988 Rayfiel
4,756,531 A 7/1988 DiRe et al.
4,838,552 A 6/1989 Hagiwara
4,991,848 A 2/1991 Greenwood et al.
5,019,973 A 5/1991 Wilcox et al.
5,085,436 A 2/1992 Bennett
5,209,479 A 5/1993 Nagao et al.
5,344,144 A 9/1994 Canon
5,393,061 A 2/1995 Manship et al.
5,395,111 A 3/1995 Inoue
5,449,173 A 9/1995 Thomas et al.
5,580,053 A 12/1996 Crouch
5,580,055 A 12/1996 Hagiwara
5,584,764 A 12/1996 Inoue
5,611,535 A 3/1997 Tiberio
5,655,961 A 8/1997 Acres et al.
5,722,891 A 3/1998 Inoue
5,752,881 A 5/1998 Inoue
5,769,716 A 6/1998 Saffari et al.
5,772,509 A 6/1998 Weiss
5,788,573 A 8/1998 Baerlocher et al.
5,807,172 A 9/1998 Piechowiak
5,823,874 A 10/1998 Adams
5,833,536 A 11/1998 Davids et al.
5,833,537 A 11/1998 Barrie
5,848,932 A 12/1998 Adams
5,851,148 A 12/1998 Brune et al.
5,882,261 A 3/1999 Adams
5,890,962 A 4/1999 Takemoto
5,902,184 A 5/1999 Bennett
5,919,088 A 7/1999 Weiss
5,927,714 A 7/1999 Kaplan
5,947,820 A 9/1999 Morro et al.
5,951,397 A 9/1999 Dickinson
5,980,384 A 11/1999 Barrie
5,984,781 A 11/1999 Sunaga
5,984,782 A 11/1999 Inoue
5,997,401 A 12/1999 Crawford
6,004,207 A 12/1999 Wilson, Jr. et al.
6,015,346 A 1/2000 Bennett
6,027,115 A 2/2000 Griswold et al.
6,033,307 A 3/2000 Vancura
6,053,813 A 4/2000 Mathis
6,056,642 A 5/2000 Bennett
6,059,289 A 5/2000 Vancura
6,062,980 A 5/2000 Luciano
6,089,976 A 7/2000 Schneider et al.
6,089,977 A 7/2000 Bennett
6,093,102 A 7/2000 Bennett
6,095,921 A 8/2000 Walker et al.
6,102,798 A 8/2000 Bennett
6,113,098 A 9/2000 Adams
6,120,031 A 9/2000 Adams
6,120,377 A 9/2000 McGinnis, Sr. et al.
6,120,378 A 9/2000 Moody et al.
6,126,542 A 10/2000 Fier
6,146,273 A 11/2000 Olsen
6,155,925 A 12/2000 Giobbi et al.
6,159,095 A 12/2000 Frohm et al.
6,159,097 A 12/2000 Gura
6,159,098 A 12/2000 Slomiany et al.
6,165,070 A 12/2000 Nolte et al.
6,168,520 B1 1/2001 Baerlocher et al.
6,174,233 B1 1/2001 Sunaga et al.
6,186,894 B1 2/2001 Mayeroff
6,190,254 B1 2/2001 Bennett
6,190,255 B1 2/2001 Thomas et al.
6,200,217 B1 3/2001 Osawa
6,203,430 B1 3/2001 Walker et al.
6,220,959 B1 4/2001 Holmes, Jr. et al.
6,224,483 B1 5/2001 Mayeroff
6,227,971 B1 5/2001 Weiss
6,231,442 B1 5/2001 Mayeroff
6,241,607 B1 6/2001 Payne et al.
6,251,013 B1 6/2001 Bennett
6,254,483 B1 7/2001 Acres
6,261,177 B1 7/2001 Bennett
6,261,178 B1 7/2001 Bennett
6,270,411 B1 8/2001 Gura et al.
6,299,165 B1 10/2001 Nagano
6,309,299 B1 10/2001 Weiss
6,309,300 B1 10/2001 Glavich
6,311,976 B1 11/2001 Yoseloff et al.
6,315,660 B1 11/2001 DeMar et al.
6,315,664 B1 11/2001 Baerlocher et al.
6,319,124 B1 11/2001 Baerlocher et al.
6,328,649 B1 12/2001 Randall et al.
6,336,860 B1 1/2002 Webb
6,346,043 B1 2/2002 Colin et al.
6,347,996 B1 2/2002 Gilmore et al.
6,364,314 B1 4/2002 Canterbury
6,364,766 B1 4/2002 Anderson et al.
6,413,162 B1 7/2002 Baerlocher et al.
6,419,579 B1 7/2002 Bennett
6,439,993 B1 8/2002 O'Halloran
6,461,241 B1 10/2002 Webb et al.
6,464,581 B1 10/2002 Yoseloff et al.
6,477,251 B1 * 11/2002 Szrek et al. .................... 380/46
6,491,584 B2 12/2002 Graham et al.
6,494,454 B2 12/2002 Adams
6,517,432 B1 2/2003 Jaffe
6,547,242 B1 4/2003 Sugiyama et al.
6,551,187 B1 4/2003 Jaffe
6,558,254 B2 5/2003 Baelocher et al.
6,561,900 B1 5/2003 Baerlocher et al.
6,585,591 B1 * 7/2003 Baerlocher et al. ............ 463/25
6,602,137 B2 8/2003 Kaminkow et al.
6,604,999 B2 * 8/2003 Ainsworth .................. 463/20
6,605,002 B2 8/2003 Baerlocher
6,609,971 B2 8/2003 Vancura
6,612,575 B1 9/2003 Cole et al.
6,616,142 B2 9/2003 Adams
6,712,693 B1 3/2004 Hettinger
6,857,958 B2 2/2005 Osawa
6,942,567 B2 * 9/2005 Baerlocher et al. ............ 463/16
7,011,581 B2 3/2006 Cole et al.
7,029,395 B1 4/2006 Baerlocher
7,507,155 B2 * 3/2009 Mead et al. .................. 463/16
2001/0048193 A1 12/2001 Yoseloff et al.
2001/0054794 A1 12/2001 Cole et al.
2002/0025844 A1 2/2002 Casey et al.
2002/0026923 A1 * 3/2002 Bertsch et al. .............. 123/300
2002/0055382 A1 5/2002 Meyer
2002/0094857 A1 7/2002 Meyer
2003/0013518 A1 1/2003 Graham
2003/0027625 A1 2/2003 Rowe
2003/0045345 A1 3/2003 Berman
2003/0054875 A1 3/2003 Marks et al.
2003/0092480 A1 5/2003 White et al.
2003/0114215 A1 6/2003 Adams et al.
2003/0216165 A1 11/2003 Singer et al.
2004/0009803 A1 1/2004 Bennett et al.
2004/0023714 A1 2/2004 Asdale
2004/0195773 A1 * 10/2004 Masci et al. ................ 273/317
2004/0242313 A1 12/2004 Munoz
2004/0242314 A1 12/2004 Casey
2005/0075157 A1 4/2005 Seelig et al.
2005/0130733 A1 * 6/2005 Mierau et al. ................. 463/20
2005/0153770 A1 7/2005 Vancura
2005/0170876 A1 * 8/2005 Masci et al. .................. 463/16

| | | | | |
|---|---|---|---|---|
| 2006/0160609 | A1 * | 7/2006 | Dicarlo | 463/25 |
| 2007/0026923 | A1 * | 2/2007 | Muir | 463/16 |

FOREIGN PATENT DOCUMENTS

| | | | |
|---|---|---|---|
| EP | 0 060 019 | | 9/1982 |
| EP | 0 238 289 | A3 | 9/1987 |
| EP | 0 410 789 | A2 | 7/1990 |
| EP | 0 945 837 | A2 | 9/1999 |
| EP | 0 984 408 | A2 | 3/2000 |
| EP | 1 205 984 | A2 | 10/2001 |
| EP | 1 298 606 | | 4/2003 |
| EP | 1 184 822 | A3 | 6/2003 |
| EP | 1 396 829 | | 3/2004 |
| GB | 2 170 636 | | 2/1986 |
| GB | 2 226 907 | | 7/1990 |
| GB | 2 328 311 | A | 2/1999 |
| WO | WO 00/66235 | | 11/2000 |
| WO | WO 00/76606 | | 12/2000 |
| WO | WO 01/19476 | | 3/2001 |
| WO | WO 01/87441 | | 11/2001 |
| WO | WO 02/17250 | | 2/2002 |
| WO | WO 03/049055 | A2 | 3/2003 |
| WO | WO 03/026758 | | 4/2003 |

OTHER PUBLICATIONS

Basics of Pick 'Em Poker website, written by gambling-hall-online, published Aug. 17, 2004.
Big Times Red, White &Blue Advertisement, written by IGT, published in 2005.
Bingo Advertisement written by Casino Data System, published in 1998.
Black Swan advertisement by IGT, published prior to 2001.
Crazy Fruits Article written by Strictly Slots, published in 2001.
Double Diamond District Slotto Advertisement, written AC Coin & Slot, published 2003.
Enchanted Unicorn Advertisement, written by IGT, published in 2001.
Evil Kneivel Advertisement written by IGT, published in 2001.
Five Card Instant Bingo Advertisement , written by IGT, published in 2000.
Fortune Cookie Advertisement written by IGT, published in 2000.
Money to Burn Advertisement written by WMS Gaming, Inc., published date unknown.
Multi-Card Bingo Article, written by IGT, published in Strictly Slots in Mar. 2001.
Office Action dated Oct. 6, 2006 for U.S. Appl. No. 10/984,169.
Office Action dated Apr. 11, 2007 for U.S. Appl. No. 10/984,169.
Penguin Pays Advertisement, written by Aristocrat Incorporated, published in 1998.
A Quantum Leap for Video Poker game descriptions written by IGT published in 2001.
Reel MAGIC™ Gaming Machine Description, written by IGT, available in 1986.
Regis Cash Club Advertisement written by IGT, published in 2000.
Slot Bingo Screenshot, written by IGT, available prior to Feb. 20, 2003.
Slot Machines Article, written by Marshall Fey, published 1983, 1989, 1991, 1994 and 1997.
South Park Advertisement written by IGT, published in 2000.
Sphinx II—e-motion Article in Strictly Slots, written by Atronic Casino Technology Ltd., undated.
Stooges II Article written by Strictly Slots, published in Jun. 2001.
Texas Tea Advertisement written by IGT, published in 2000.
Totem Pole Advertisement written by IGT, published in 1997.
Triple Double Diamond Slots Advertisement, written by IGT, published in 2005.
Wild Streak Advertisement, written by WMS Gaming, Inc., published in 2001.

* cited by examiner

FIG. 3B

120

122 | 124

| WINNING SYMBOL COMBINATIONS | AWARD |
|---|---|
| A - A - A - A - A | 500 |
| B - B - B - B - B | 200 |
| C - C - C - C - C | 150 |
| D - D - D - D - D | 100 |
| E - E - E - E - E | 100 |
| F - F - F - F - F | 30 |
| G - G - G - G - G | 30 |
| H - H - H - H - H | 15 |
| I - I - I - I - I | 15 |
| A - A - A - A | 200 |
| B - B - B - B | 100 |
| C - C - C - C | 100 |
| D - D - D - D | 50 |
| E - E - E - E | 50 |
| F - F - F - F | 20 |
| G - G - G - G | 20 |
| H - H - H - H | 10 |
| I - I - I - I | 10 |
| A - A - A | 50 |
| B - B - B | 20 |
| C - C - C | 20 |
| D - D - D | 15 |
| E - E - E | 15 |
| F - F - F | 10 |
| G - G - G | 10 |
| H - H - H | 5 |
| I - I - I | 5 |

FIG. 3C

130

| NUMBER OF ACTIVATED PAYLINES (132) | NUMBER OF CREDITS BET PER PAYLINE (134) | TOTAL BET (136) | BONUS MULTIPLIER (138) |
|---|---|---|---|
| 1 | 1 | 1 | 2X |
| | 2 | 2 | 4X |
| | 3 | 3 | 6X |
| | 4 | 4 | 8X |
| | 5 | 5 | 10X |
| 2 | 1 | 2 | 4X |
| | 2 | 4 | 8X |
| | 3 | 6 | 12X |
| | 4 | 8 | 16X |
| | 5 | 10 | 20X |
| 3 | 1 | 3 | 6X |
| | 2 | 6 | 12X |
| | 3 | 9 | 18X |
| | 4 | 12 | 24X |
| | 5 | 15 | 30X |

SLOT MACHINE GAME HAVING A PLURALITY OF WAYS FOR A USER TO OBTAIN PAYOUTS FOR ONE OR MORE ADDITIONAL PAY LINES FORMED BY THE APPEARANCE OF SPECIAL SYMBOLS IN A SYMBOL MATRIX

PRIORITY CLAIM

This application is a continuation of, claims priority to and the benefit of U.S. patent application Ser. No. 10/371,016, filed Feb. 20, 2003, which is a Non-Provisional Patent Application of and which claims the benefit of U.S. Provisional Patent Application Ser. No. 60/357,637, filed Feb. 20, 2002.

COPYRIGHT NOTICE

A portion of the disclosure of this patent document contains or may contain material, which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make gaming devices that provide as much enjoyment and excitement as possible. Providing a game in which a player has an opportunity to win multiple awards and potentially large awards or credits are ways to enhance player enjoyment and excitement. Currently, gaming machines or devices provide games, such as slot games, wherein a player has one or more opportunities to obtain a winning symbol combination on mechanical or video reels. The winning symbol combination may be along the same payline or on different paylines (known as a scatter pay). By providing gaming devices with more winning symbol combinations, players have more opportunities to receive an award.

In slot games, credits are awarded to the player for each winning symbol combination based on a predetermined schedule (known as a “pay table”). In some slot games, the credits awarded to a player are determined based on a pay table associated with a wager made by the player. For example, a wager of one credit by a player provides a paytable having awards ranging from one to ten credits for winning combinations indicated on the reels. A wager of three credits by the player provides a paytable having awards ranging from fifty to one thousand credits for the same winning combinations. Alternatively, the credits awarded to a player may be based on the number of credits wagered on the winning payline multiplied by the number of credits indicated by the pay table for the winning symbol combination indicated on the payline. For example, a player may wager two credits each on five paylines, spin the reels, and collect twice the amount indicated on the pay table for a payline or scatter pay appearing on any of the five played paylines.

Following any payline pays or scatter pay, the credits won are added to the player’s balance of credits. As long as the player has credits, the player may continue to play the gaming machine. In addition, the player may also: collect the remaining balance of credits by pressing a Cash Out button on the gaming machine; view the rules of the game by pressing the Help button before any spin; and/or view the game’s pay table by pressing the Pays (or Pay Table) button before any spin.

Thus, a conventional slot machine issues awards for the winning combinations described above, according to a pay table. Because the winning combinations and the payouts or awards associated with the winning combinations are similar for certain gaming machines, players can suffer from boredom by playing new games that really use different graphics to illustrate the same old winning combinations and awards.

Thus, it is an object of the present invention to provide new, exciting and entertaining games by creating additional and/or enhanced awards by generating one or more additional or bonus pay lines formed by the appearance of special symbols in the symbol matrix.

SUMMARY

One embodiment of the present invention is directed to a gaming device and a method of operating the gaming device including a plurality of reels having bonus payline symbols which form at least one additional or bonus payline in a game when the bonus payline symbols are randomly generated, indicated or displayed on the reels.

In one embodiment, the gaming device includes a plurality of reels having symbols where the symbols include at least one bonus payline symbol. The gaming device or player activates or spins the reels to indicate winning combinations of symbols on the reels. The gaming device provides an award for any winning combinations of symbols indicated on a payline associated with the reels. Additionally, any bonus payline symbols indicated on the reels form one or more additional or bonus paylines in the spin. The gaming device evaluates the bonus payline symbols indicated on the bonus payline or paylines to determine if these symbols indicate a winning combination of symbols. The gaming device provides a bonus award for any winning combinations of symbols indicated on the bonus payline in the activation or spin.

In one aspect of this embodiment, if a bonus award is provided to the player, the bonus award is modified by a bonus modifier such as a multiplier associated with the bonus payline to enhance the bonus award. The modified bonus award is added to any other awards obtained by the player in that spin and then added to the total award in the game. A game may include zero, one or a plurality of bonus modifiers associated with the bonus payline. The bonus award and bonus multiplier of the present invention provide additional awards and larger awards to a player in a game. Therefore, the present invention increases the excitement and enjoyment of the game by a player.

In one embodiment, the symbols on the reels are represented by letters. It should be appreciated that the symbols may be represented by numbers, letters, characters or any other suitable images. The symbols also include at least one bonus payline symbol. The bonus payline symbol or symbols may be designated by any suitable characteristic such as by shape, color, type or by a random or predetermined symbol position on the reels. In one embodiment, the bonus payline symbols are spaced apart on the reels (i.e., mechanical reels) to limit the number of bonus payline symbols indicated on a reel or reels in each spin of the reels. In one embodiment, each reel includes zero, one or more bonus payline symbols. It should be appreciated that any suitable number of bonus payline symbols may be included on the reels. In one aspect of this embodiment, the symbols also include at least one bonus game triggering symbol. The bonus game triggering symbol triggers a bonus game or a subsequent game when a designated number of the bonus game triggering symbols are indicated on the reels or on an active payline in a spin. In another aspect of this embodiment, the symbols include at least one wild symbol. The wild symbol or symbols replace any symbol on the reels in determining winning combinations of symbols on the reels in a spin.

In one embodiment, a plurality of winning combinations of symbols are determined in a game. The winning combinations may be randomly determined, pre-determined or based on a wager made by a player. The winning combinations may change in each activation or spin of the reels, in a plurality of spins or in a designated number of spins in a game. In one embodiment, the winning combinations of symbols include a designated number of the same symbols in a game. It should be appreciated that the winning combinations of symbols may include the same symbols or at least one different symbol. It should also be appreciated that the winning combinations of symbols may include any suitable number of symbols. The gaming device provides an award to a player based on the winning combination or combinations of symbols indicated on the reels.

In one embodiment, a plurality of paylines are associated with the reels. The paylines indicate winning combinations of symbols in a game. In one embodiment, at least one of the winning combinations of symbols is indicated on a specific payline. In another embodiment, at least one of the winning combinations of symbols is indicated on a plurality of paylines. In a further embodiment, the winning combination of symbols is indicated on all of the paylines associated with the reels. The paylines may extend horizontally, vertically, diagonally or in any suitable configuration across the reels.

The bonus payline symbols indicated on the reels in a spin are first evaluated with the other symbols indicated on the reels to determine if the symbols (including the bonus payline symbols) indicate a winning combination of symbols on the reels. Additionally, the bonus payline symbols indicated on the reels form a bonus or additional payline in the game. In one embodiment, the bonus payline is not wagered upon by the player. In another embodiment, the gaming device enables the player to place a wager on the bonus payline. The gaming device evaluates and determines whether the bonus payline symbols indicated by the bonus payline indicate a winning combination of symbols in a spin. If the symbols on the bonus payline indicate a winning combination of symbols, the gaming device provides an additional or bonus award to the player. Any suitable number of bonus paylines may be formed by the bonus payline symbols indicated on the reels in a game. Also, the number of bonus paylines may change based on a player input, a third party input, the number of spins, a predetermined symbol combination, the wager level or wager amount or the number of bonus paylines may randomly change in a game. Furthermore, the bonus payline may be displayed on the same display device as the reels or on a different display device.

In another embodiment, one or more of the bonus payline symbols trigger at least one free spin of the reels (i.e., a triggering event). As a result, the gaming device provides at least one free spin of the reels when one or more designated bonus payline symbols are indicated on the bonus payline. In another embodiment, one or more of the symbols (which are not bonus payline symbols) trigger at least one free spin of the reels. In a further embodiment, one or more of the symbols and/or the bonus payline symbols, trigger at least one free spin of the reels. The number of free spins provided by the gaming device may be randomly determined, predetermined, based on a wager made by the player or based on any suitable determination method. It should be appreciated that one or more triggering events may be employed in a game to provide at least one free spin of the reels in the game.

In a further embodiment, one or more bonus payline symbols and/or symbols that are not bonus payline symbols trigger at least one free spin of the reels to indicate symbols on a bonus payline formed in a spin. In this embodiment, the free spin or spins only apply to the bonus payline. Therefore, the gaming device or player spins the reels using the free spin or spins to indicate symbols on the bonus payline. The gaming device provides a bonus award or awards to a player for any winning combinations of symbols indicated on the bonus payline using the free spin or free spins. In another embodiment, a plurality of bonus paylines are formed in a spin and any free spins provided to the player are used to spin the reels and indicated symbols on one or more of the plurality of bonus paylines.

In one embodiment, the bonus award includes at least one free spin of the reels in the game. Therefore, a player may accumulate additional awards in the game using the free spin or spins from the bonus award. The bonus modifier modifies the number of free spins obtained from the bonus award to increase or decrease the number of free spins. In one aspect of this embodiment, the free spin or spins are used to spin the reels to indicate symbols on one or more of the paylines associated with the reels. In another embodiment, the free spin or spins are used to spin the reels to indicate symbols on one or more of the bonus paylines as described above. It should be appreciated that the number of free spins associated with the bonus award may be predetermined, randomly determined, based on a wager made by the player or based on any suitable determination method.

In one embodiment, the gaming device includes a bonus payline window or bonus symbol display having bonus symbol indicators, which displays the bonus payline or paylines formed in a spin or spins in a game. The bonus symbol display may be displayed above the reels, below the reels or in any suitable location on the display device. The bonus symbol display may include any number of bonus symbol indicators (i.e., any number of bonus payline symbols). In addition, the number of bonus symbol indicators may change based on a player input, a third party input, a number of spins, the winning combinations of symbols, the wager level or wager amount or the number of bonus symbol indicators may randomly change in a game. The bonus symbol indicators display the bonus payline symbols indicated on the reels in a spin or spins. In one embodiment, each bonus symbol indicator indicates a single bonus payline symbol indicated on the reels. In another embodiment, the bonus symbol indicators indicate a plurality of the bonus payline symbols indicated on the reels in a spin or spins. Furthermore, the bonus payline symbols may be displayed in any of the bonus symbol indicators and in any order. For example, the bonus payline symbols may be displayed in the bonus symbol indicators based on the order of appearance of the bonus payline symbols on the reels, based on the appearance of the bonus payline symbols on a specific reel or reels or in specific positions on the reels, randomly displayed in the bonus symbol indicators or in any other suitable order. In one embodiment, the bonus payline symbols indicated on the reels are copied from the reels and displayed by the bonus symbol indicators to form a bonus payline. In another embodiment, the bonus payline symbols are removed from the reels and displayed by the bonus symbol indicators to form the bonus payline. The indicated bonus payline symbols may form one, a plurality or all of the bonus paylines represented by the bonus symbol displays in a game. In one embodiment, at least one bonus modifier such as a bonus multiplier is associated with the bonus payline. The bonus multiplier may be any suitable multiplier. In one embodiment, the bonus multiplier is determined by multiplying the number of paylines by the number of credits bet per payline and then multiplying that result by two. In another embodiment, the bonus multiplier is based on a linear algorithm. In a further embodiment, the bonus multiplier is based on a non-linear algorithm. It should be appreciated that the bonus multiplier may be randomly determined, predetermined, determined according to a wager made by the player or based upon the bet or wager per payline, the number of activated paylines, number of selected symbols, the total wager in a spin or spins, a player input, a third party input or determined according to any suitable determination method. The bonus multiplier modifies or multiplies the spin award obtained by the player in that spin.

In another embodiment of the present invention, a plurality of bonus paylines are formed in a game. Any bonus payline symbols indicated on the reels are transferred and displayed in the bonus symbol display to form the bonus paylines. In one embodiment, the same bonus payline symbols form all of the bonus paylines. In another embodiment, different bonus payline symbols form different bonus paylines. It should be appreciated that a game may include one or a plurality of bonus paylines. In one embodiment, the gaming device evaluates the symbols that form each of the bonus paylines to determine if any winning combinations of symbols are indicated by the bonus paylines. In another embodiment, the gaming device evaluates the symbols on all of the bonus paylines to determine if a scatter pay winning combination of the symbols is indicated by the bonus paylines. The gaming device then provides a bonus award or awards to the player based on the winning combinations of symbols indicated by the bonus paylines.

In a further embodiment, any bonus payline symbols that form one or more of the bonus paylines are maintained on the bonus payline for a plurality of spins in a game such as a designated number of spins. The gaming device then resets the bonus payline upon reaching the designated number of spins so that no symbols are indicated by the bonus payline. This enables a player to accumulate bonus payline symbols that form the bonus payline and obtain additional awards in the game. The designated number of spins may be randomly determined, predetermined, determined based on a wager made by the player or determined in any suitable determination method.

In a further embodiment of the present invention, the gaming device includes a plurality of bonus paylines and a bonus multiplier associated with each of the bonus paylines. The bonus multiplier may be the same bonus multiplier for each of the paylines, at least two of the bonus multipliers may be different or all of the bonus multipliers may be different. Additionally in one embodiment, the bonus multipliers are determined based on a linear progression including a wager made by the player. Therefore, the bonus multipliers are determined based on the amount of the player's wager. Alternatively, the bonus multipliers may be predetermined, randomly determined or determined according to any suitable determination method desired by the game implementor. In this embodiment, any awards associated with winning combinations of symbols indicated by the symbols that form the bonus paylines are multiplied by the bonus multipliers associated with those bonus paylines. In one embodiment, the gaming device sums the bonus awards associated with each winning combination of symbols indicated by the plurality of bonus paylines to achieve a total award and provides the total award to a player. In another embodiment, the gaming device determines the largest award associated with all of the winning combinations of symbols indicated by the bonus paylines and provides that award to the player.

In another embodiment of the present invention, the bonus multiplier associated with the bonus payline is based on the number of bonus payline symbols that form the bonus payline. In this embodiment, the bonus payline symbols indicated on the reels determine the bonus multiplier for that spin. In one embodiment, the bonus multiplier initially begins the game or a spin at a predetermined value such as 2X. It should be appreciated that the bonus multiplier may be any suitable multiplier value prior to a spin. The initial bonus multiplier may be randomly determined, predetermined, determined based on a wager made by the player or any other suitable determination method. In this embodiment, the base or initial bonus multiplier increases by a predetermined amount such as one for each bonus payline symbol indicated on the reels in a spin. The bonus multiplier may increase or decrease by a randomly determined amount or a predetermined amount for each of the bonus payline symbols indicated on the reels in a spin or spins. Additionally, the bonus multiplier may increase or decrease based on the amount of the wager made by a player or a wager level in the game. For example, a wager of five provides a bonus multiplier of 5X and a wager of ten provides a bonus multiplier of 10X. Moreover, the bonus multiplier may increase or decrease based on each bonus payline symbol indicated on the reels or a plurality of bonus symbols indicated on the reels in a spin or spins.

In another embodiment, the symbols include at least one modifier symbol which modifies the bonus modifier in a spin. In this embodiment, if the modifier symbol is indicated on the reels, the bonus modifier is modified. The bonus modifier may increase, decrease or remain unchanged when the modifier symbol is indicated on the reels. In addition, the bonus modifier may change by a predetermined amount or a random amount. The modifier symbol may also change the bonus modifier in one spin, a plurality of spins or in all of the spins in a game.

In another embodiment of the present invention, the gaming device includes different bonus payline symbols such as "winner" bonus payline symbols and "loser" bonus payline symbols. In this embodiment, in each spin, the reels indicate symbols, which may include one or more winner bonus payline symbols and one or more loser bonus payline symbols. All of the bonus payline symbols indicated on the reels in a spin form the bonus payline in that spin. The gaming device then determines if any loser bonus payline symbols are included in the combination of symbols that form the bonus payline. If the bonus payline includes one or more loser symbols, the gaming device does not provide a bonus award to the player in that spin, regardless if a winning combination of symbols is indicated by the payline. If the bonus payline indicates all winner bonus payline symbols (and no loser bonus payline symbols) the gaming device evaluates the combination of symbols that form the bonus payline to determine if a winning combination of symbols is indicated by the bonus payline. If the symbols indicate a winning combination of symbols, the gaming device provides a bonus award associated with that winning combination to the player in the spin. Although the bonus payline symbols are referred to as winner bonus payline symbols and loser bonus payline symbols, the different bonus payline symbols may be designated as any suitable type of symbols.

In another aspect of this embodiment, the bonus payline symbols include at least one bonus activator symbol or activator symbol. In this embodiment, the bonus payline symbols indicated on the reels form the bonus payline in a spin. The gaming device evaluates the symbols indicated on the bonus payline to determine if a bonus activator symbol is included in those symbols. If the symbols do not include a bonus activator symbol, the gaming device does not provide a bonus award to the player for that spin. Thus, the bonus activator symbol activates the bonus payline and enables the player to obtain a bonus award if the symbols indicated by the bonus payline indicate a winning combination of symbols. Alternatively, the bonus payline symbols may include a de-activator symbol instead of an activator symbol, where the de-activator symbol de-activates the bonus payline when the symbols that form the bonus payline include the de-activator symbol.

In a further embodiment of the present invention, the gaming device highlights the bonus payline symbols indicated on the reels in a spin. In this embodiment, the bonus payline symbols indicated on the reels in a spin do not form a bonus payline or are not transferred and displayed in a separate bonus symbol display. Instead, the bonus payline symbols are highlighted on the reels when the bonus payline symbols appear on the reels in a spin. In one embodiment, the bonus payline symbols are highlighted using one or more illumination devices or mechanism associated with the reels. In another embodiment, the bonus payline symbols are indicated on the reels by using a different color associated with the bonus payline symbols than the color or colors associated with the other symbols on the reels. It should be appreciated that any suitable color, shape, symbol or image may be employed in a game to indicate or otherwise identify the bonus payline symbols indicated on the reels in a spin. In a further embodiment, the bonus payline symbols indicated on the reels may be highlighted in a plurality of different colors to indicate winner or loser bonus payline symbols or a bonus activator or de-activator symbol as described above. It should be appreciated that any suitable highlighting or indicating method may be employed to indicate or identify the bonus payline symbols on the reels in a game.

In another embodiment, the symbols on the reels include one or more bonus payline symbols that are randomly generated on the reels after the reels are activated. In this embodiment, the gaming device or player spins the reels to indicate symbols on the reels. After the reels stop spinning, the gaming device randomly generates zero, one or a plurality of bonus payline symbols on the reels. The bonus payline symbols, which are randomly generated on the reels, form the bonus payline for that spin. The bonus payline symbols may be randomly generated in each spin of the reels or in a plurality of spins of the reels in a game. Additionally, the bonus payline symbols may also be randomly generated in a predetermined or designated number of spins of the reels such as the first five spins of the reels in a game. Furthermore in one aspect of this embodiment, the number of bonus payline symbols randomly generated in a spin is a predetermined or pre-designated number of bonus payline symbols.

It is therefore an advantage of the present invention to provide a gaming device having bonus payline symbols that form at least one bonus payline in a game.

Another advantage of the present invention is to provide a gaming device that provides additional awards in a game.

A further advantage of the present invention is to provide a gaming device that provides several opportunities to obtain awards in a game.

Other objects, features and advantages of the invention will be apparent from the following detailed disclosure, taken in conjunction with the accompanying sheets of drawings, wherein like numerals refer to like parts, elements, components, steps and processes.

Additional features and advantages are described herein, and will be apparent from the following Detailed Description and the figures.

BRIEF DESCRIPTION OF THE FIGURES

FIG. 3B is a schematic of an award table associated with the embodiment of FIG. 3A.

FIG. 3C is a schematic of a bonus multiplier table associated with the embodiment of FIG. 3A.

DETAILED DESCRIPTION

Gaming Device and Electronics

Figure 1A:
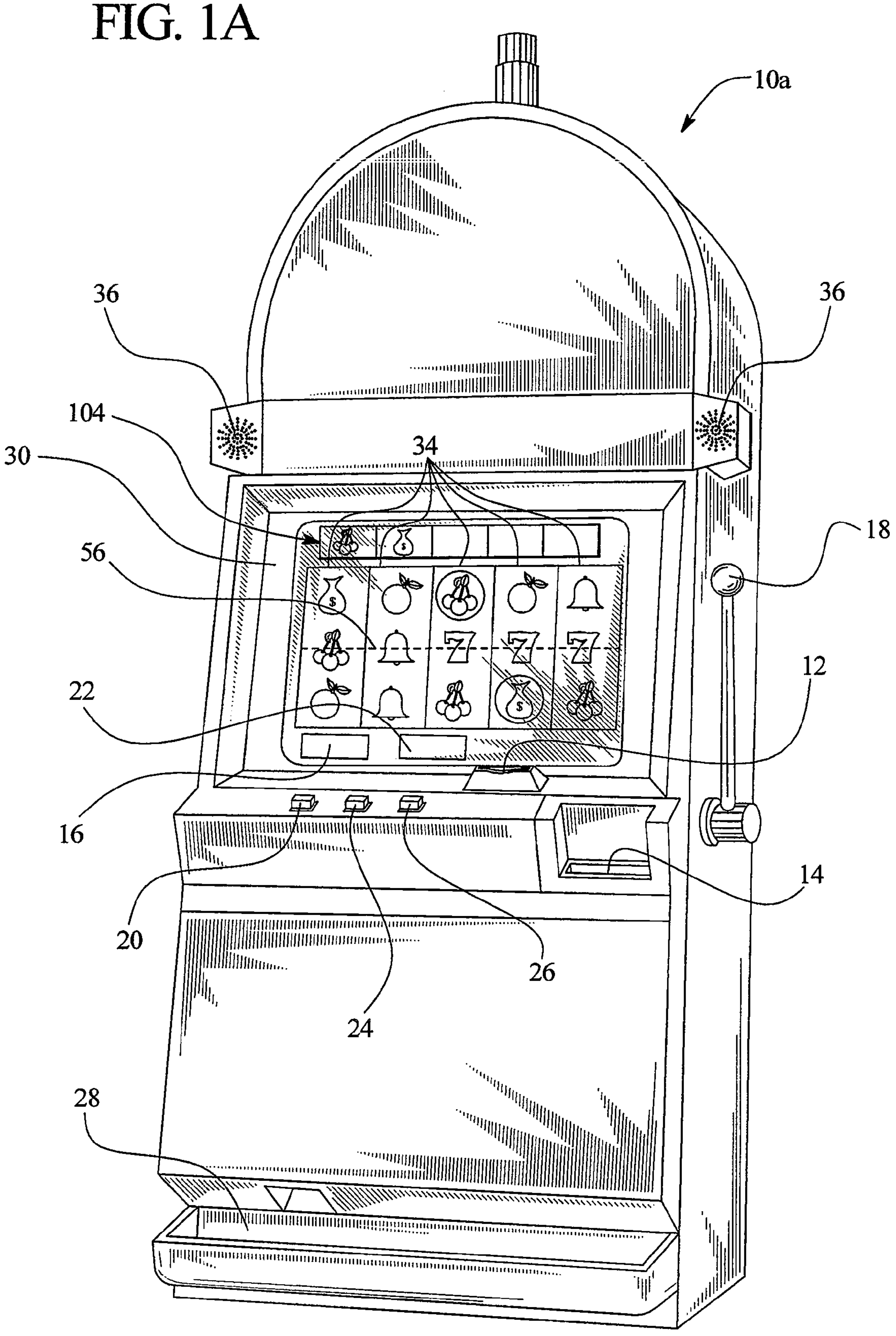
FIG. 1A is a front perspective view of one embodiment of the gaming device of the present invention.
Figure 1B:
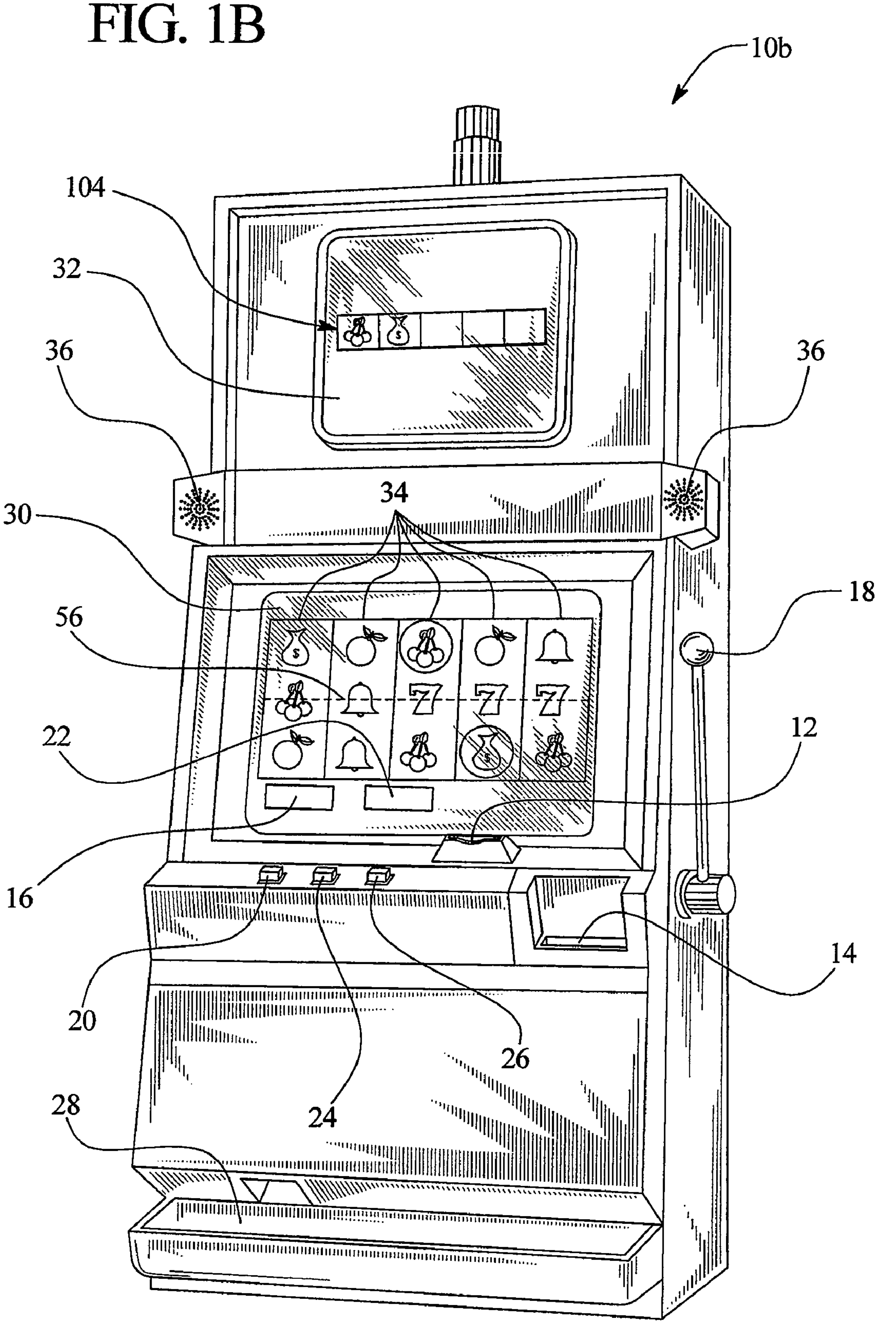
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 in one embodiment has the controls, displays and features of a conventional slot machine. It is constructed so that a player can operate it while standing or sitting, and gaming device 10 is preferably mounted in a cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 is primary directed to a primary slot game, and may also incorporate any other primary game such as poker, blackjack or keno, and any of the bonus triggering events and bonus games associated with any of these primary games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. Other bet or wager indicators such as a bet max button, payline selection button or buttons, bet per payline button (not shown) and any other suitable inputs or buttons may also be employed in the gaming device of present invention.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, an upper display device 32, and the alternative embodiment shown in FIG. 1B includes a central display device 30 as well as an upper display device 32. Gaming device 10 in one embodiment displays a plurality of reels 34 such as three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for producing sounds such as music.

Figure 2:
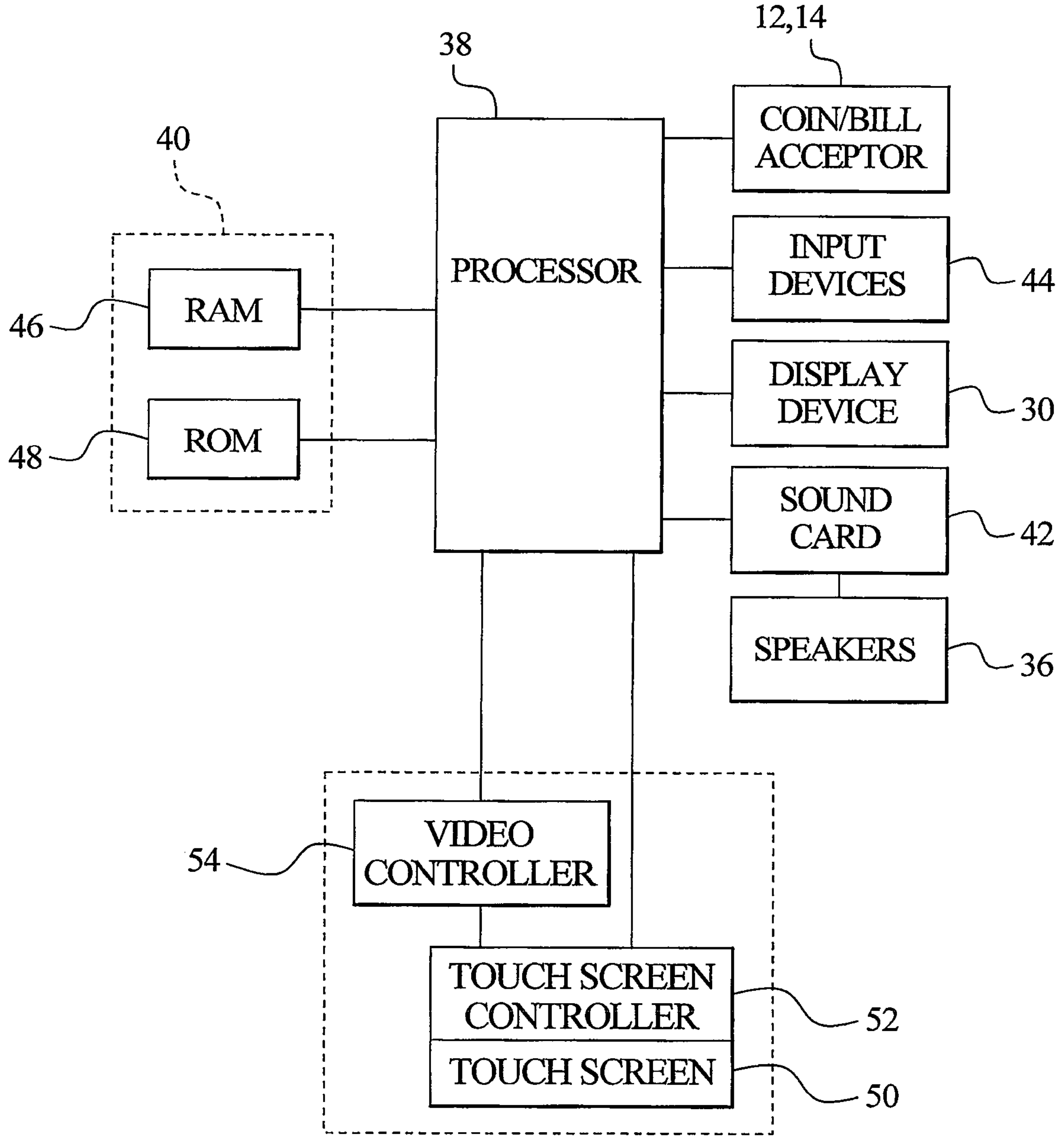
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. One or more secondary processors may also be employed in conjunction with the primary processor to control certain aspects of the game function. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10, in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, in one embodiment gaming device 10 also gives players the opportunity to win credits in a bonus round. This type of gaming device 10 will include a program which will automatically begins a bonus round when the player has achieved a qualifying condition in the game. This qualifying condition can be a particular arrangement of indicia on a display device. The gaming device 10 may use mechanical devices or a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Payline Symbols

One embodiment of the present invention is directed to a gaming device and a method of operating the gaming device including a plurality of reels having bonus payline symbols which form at least one bonus payline in a game when the bonus payline symbols are indicated on the reels.

In one embodiment, the gaming device includes a plurality of reels having symbols where the symbols include at least one bonus payline symbol. The gaming device or player activates or spins the reels based upon a wager made by the player to indicate winning combinations of symbols on the reels. The gaming device provides an award for any winning combinations of symbols indicated on a payline associated with the reels. Additionally, the gaming device provides a bonus award for any winning combinations of bonus payline symbols indicated on the bonus payline.

In one embodiment, any bonus payline symbols indicated on the reels are transferred and displayed in a bonus symbol display, which forms a bonus payline separate from the reels in the game. If the bonus symbols indicated in the bonus symbol display (or bonus payline) indicate a winning combination of symbols, the gaming device provides an additional or bonus award to the player in that spin. In another embodiment, the bonus payline is formed on the reels by highlighting the bonus payline symbols indicated on the reels in a spin as further described below. If the highlighted symbols, which form the bonus payline, indicate a winning combination of symbols, the gaming device provides the bonus award to the player. In one embodiment, the gaming device enables the player to place a wager on the bonus payline. In another embodiment, the gaming device does not enable the player to place a wager on the bonus payline.

In one embodiment, if a bonus award is provided to the player and is modified by a modifier such as a multiplier associated with the bonus payline to enhance the bonus award. The modified bonus award is added to any other awards obtained by the player in that spin and added to the total award in the game. The bonus award and bonus multiplier of the present invention provide additional awards and larger awards to a player in a game. Therefore, the present invention increases the excitement and enjoyment of the game by the player.

Figure 3A:
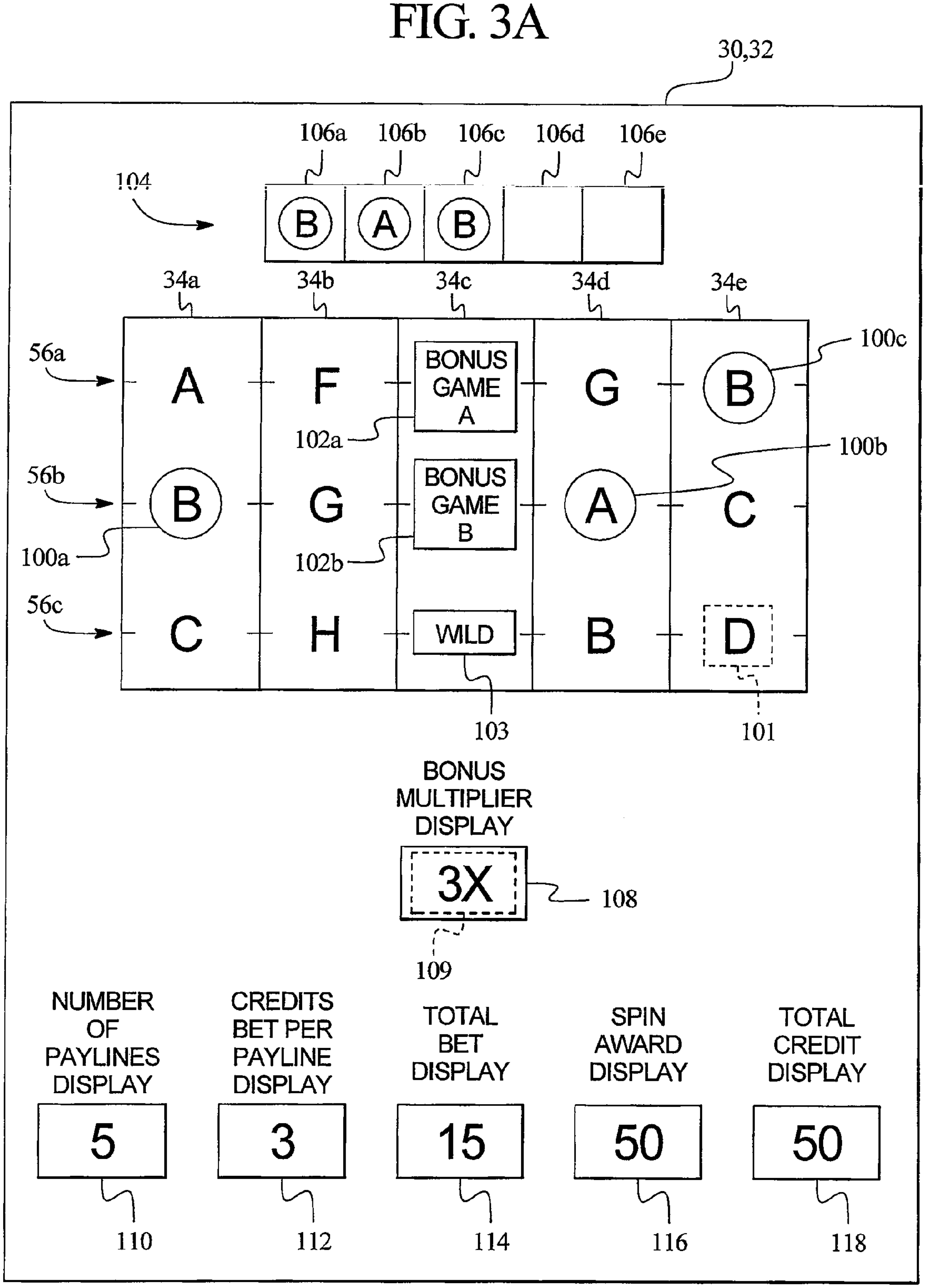
FIG. 3A is an enlarged elevation view of one embodiment of the gaming device of the present invention.

Referring now to FIG. 3A, one embodiment of the gaming device 10 includes a plurality of reels, such as reels 34*a*, 34*b*, 34*c*, 34*d* and 34*e*. The reels include symbols such as the letters A, B, C, D, E, F, G, H and I. It should be appreciated that the symbols may be any suitable symbol, shape, color, character or image. In one aspect of this embodiment, the symbols also include bonus game symbols 102*a* and 102*b*. The bonus game symbols 102 trigger a separate bonus game or subsequent game when a designated number of the symbols are indicated on the reels in a spin. The designated number of symbols may be randomly determined, predetermined or determined in any suitable manner. In another aspect of this embodiment, the symbols include at least one wild symbol 103. The wild symbol or symbols replace any or all other symbols on the reels in determining winning combinations of symbols on the reels in a spin. In this embodiment, the wild symbol is indicated by the word "WILD"; however, the wild symbol may be designated with any suitable symbol or image.

The symbols 101 also include bonus payline symbols 100, which in this embodiment, are designated as symbols enclosed in a circle. In another embodiment, the bonus payline symbols are symbols designated with a special mark such as a "$" or other suitable identifier that defines a symbol as a bonus payline symbol. It should be appreciated that the bonus payline symbols may be designated in any suitable manner such as by shape, color, symbol type or by a random or predetermined symbol position on the reels. As described above, the bonus payline symbols may be letters, numbers, characters or any other suitable symbols or images. In one embodiment, each reel 34 includes zero or one bonus payline symbol. In a mechanical version of this embodiment, the symbols including the bonus payline symbols are spaced on the reels so that none or one bonus payline symbol is indicated on a reel in a spin. Similarly in a video version of this embodiment, the symbols including the bonus payline symbols are spaced on the virtual reels so that none or one bonus payline symbol is indicated on a reel in a spin. In another embodiment, each reel includes a plurality of bonus payline symbols wherein one or more of the bonus payline symbols may be indicated on a reel in a spin. Additionally, in one embodiment, the bonus payline symbols act as both regular symbols and also bonus payline symbols on the reels in a game. In this embodiment, as described above, all of the symbols on the reels are the same except that some of the symbols (i.e., the bonus payline symbols) are designated with a special indicator or mark such as "$" to designate that a symbol in the group of symbols as a special symbol or bonus payline symbol. In this embodiment, the wild symbols and bonus game triggering symbols are not designated as bonus payline symbols. However, it should be appreciated that in other embodiments, any of the symbols may be designated as bonus payline symbols. Thus, a winning combination of symbols on a payline may include both symbols that are not designated as bonus payline symbols and symbols that are designated as bonus payline symbols. In another embodiment, the symbols include a different set of symbols which are bonus payline symbols. In this embodiment, the bonus payline symbols do not act as regular symbols and therefore do not form winning combinations of symbols on a payline associated with the reels. As a result, the bonus payline symbols only form the bonus payline and indicate a winning combination of symbols on the bonus payline.

In another embodiment, one or more of the bonus payline symbols trigger at least one free spin of the reels (i.e., a triggering event). As a result, the gaming device provides at least one free spin of the reels when one or more designated bonus payline symbols are indicated on the bonus payline. In another embodiment, one or more of the symbols (which are not bonus payline symbols) trigger at least one free spin of the reels. In a further embodiment, one or more of the symbols and/or the bonus payline symbols, trigger at least one free spin of the reels. The number of free spins provided by the gaming device may be randomly determined, predetermined, based on a wager made by the player or based on any suitable determination method. It should be appreciated that one or more triggering events may be employed in a game to provide at least one free spin of the reels in the game.

In a further embodiment, one or more bonus payline symbols and/or symbols that are not bonus payline symbols trigger at least one free spin of the reels to indicate symbols on a bonus payline formed in a spin. In this embodiment, the free spin or spins only apply to the bonus payline. Therefore, the gaming device or player spins the reels using the free spin or spins to indicate symbols on the bonus payline. The gaming device provides a bonus award or awards to a player for any winning combinations of symbols indicated on the bonus payline using the free spin or free spins. In another embodiment, a plurality of bonus paylines are formed in a spin and any free spins provided to the player are used to spin the reels and indicated symbols on one or more of the plurality of bonus paylines.

In one embodiment, a plurality of winning combinations of symbols are determined in a game. The winning combinations may be randomly determined, pre-determined or based on a wager made by a player. The winning combinations may change in each activation or spin, in a plurality of spins or in a designated number of spins of the reels. In one embodiment, the winning combinations of symbols include a designated number of the same symbols in a game. It should be appreciated that the winning combinations of symbols may include the same symbols or at least one different symbol and may include any suitable number of symbols. The gaming device provides an award to a player based on the winning combination of symbols indicated by one or more paylines associated by the reels. Additionally in one embodiment, the winning combinations of symbols on the paylines are the same as the winning combinations of symbols on the bonus paylines. In another embodiment, the winning combinations of symbols associated with the bonus payline are a subset of the winning combinations of symbols associated with the paylines. For example, a winning combination of symbols on one of the paylines includes five of the A symbols (including three of the A symbols designated as bonus payline symbols) and a winning combination of symbols on the bonus payline includes the three A symbols designated as bonus payline symbols. In a further embodiment, the winning combinations of symbols associated with the symbols indicated on the paylines are different from the winning combinations of bonus payline symbols indicated on the bonus payline. It should be appreciated that any suitable combinations of symbols and/or bonus payline symbols may be winning combinations of symbols in a game.

In one embodiment, a plurality of paylines are associated with the reels 34. The paylines 56 indicate winning combinations of symbols in a game. In one embodiment, the winning combination of symbols is indicated on a specific payline. In another embodiment, the winning combination of symbols is indicated on a plurality of paylines. In a further embodiment, the winning combination of symbols is indicated on all of the paylines associated with the reels (i.e., a scatter pay combination). It should be appreciated that one or a plurality of paylines may be associated with the reels. Additionally, the paylines in this embodiment extend horizontally across the reels 34. As described above, the paylines may extend horizontally, vertically, diagonally or in any suitable configuration across the reels 34.

The gaming device also includes a bonus payline window or bonus symbol display 104 having bonus symbol indicators 106 that display the symbols that form the bonus payline. In this embodiment, the bonus symbol display 104 includes five positions or bonus symbol indicators 106*a*, 106*b*, 106*c*, 106*d* and 106*e*. It should be appreciated that the bonus symbol display 104 may include any suitable number of bonus symbol indicators in a game. It should also be appreciated that the number of bonus symbol indicators may change based on a player input, a third party input, the number of spins, the symbols combinations, the wager level or amount or randomly change. The bonus symbol indicators 106 display the bonus payline symbols 100 indicated on the reels in a spin. Each bonus symbol indicator indicates a single bonus symbol indicated on the reels. In one embodiment, any indicated bonus symbols 100 are displayed in any of the bonus symbol indicators 106. In another embodiment, the indicated bonus symbols are displayed in specific bonus symbol indicators in any order in the bonus symbol display 104. Furthermore, the bonus payline symbols may be displayed in any of the bonus symbol indicators and in any order. For example, the bonus payline symbols may be displayed in the bonus symbol indicators based on the order of appearance of the bonus payline symbols on the reels, based on the appearance of the bonus payline symbols on a specific reel or reels or in specific positions on the reels, randomly displayed in the bonus symbols indicators or in any other suitable order. Also, the bonus payline symbols indicated on the reels may be copied and displayed by the bonus symbol indicators or removed from the reels and displayed by the bonus symbol indicators.

The bonus payline symbols displayed in the bonus symbol display 104 form a bonus or additional payline in the game. Therefore, the gaming device determines whether the symbols indicated in the bonus symbol display 104 (i.e., indicated on the bonus payline) indicate a winning combination in the game. If the bonus payline symbols indicated in the bonus symbol display or bonus payline indicate a winning combination of symbols in the game, the gaming device provides an additional or bonus award to the player in the game. Although the present embodiment includes a single bonus payline, it should be appreciated that any suitable number of bonus paylines may be formed by the bonus payline symbols indicated on the reels in a game. It should also be appreciated that the number of bonus symbol displays or bonus paylines may change based on a player input, a third party input, the number of spins, a predetermined symbol combination, the wager level or amount or may randomly change in a game. Furthermore, the bonus symbol display or bonus payline 104 may be displayed on the same display device as the reels or on a different display device.

In one embodiment, at least one bonus modifier such as a bonus multiplier 109 is indicated in a bonus multiplier display 108 and is associated with the bonus payline. The bonus multiplier 109 may be any suitable multiplier. In one embodiment, the bonus modifier or multiplier is established by using a linear progression or algorithm based on the total bet or wager made in a spin to determine the bonus modifier. For instance in one example, the bonus multiplier value includes the integer value of the total bet in a spin divided by the maximum possible bet for that spin. The resultant number is then multiplied by X, where X includes the integers representing the range of possible multipliers from 1 to 100. In an example, the gaming device sets X equal to 100. In the game, the player bets ten credits in a spin where a maximum of twenty credits may be bet. Thus, the bonus multiplier becomes (10/20×100) or fifty and any bonus award indicated by any winning combinations of symbols on the bonus payline is then multiplied by the bonus multiplier of fifty. In another embodiment, the bonus multiplier is based on a non-linear algorithm. In a further embodiment, the bonus multiplier 109 is determined by multiplying the number of paylines by the number of credits bet per payline and then multiplying that result by two. It should be appreciated that the bonus multiplier may be randomly determined, predetermined, determined according to a wager made by the player or based upon the bet or wager per payline, the number of activated paylines, number of selected symbols, the total wager in a spin or spins, a player input, a third party input and other suitable linear progressions and non-linear progressions. The bonus multiplier indicated by the bonus multiplier display 108 in a spin modifies or multiplies any bonus award associated with a winning combination of symbols on the bonus payline in that spin.

The gaming device also includes a number of paylines display 110 that indicates the number of paylines selected and activated by the player in the game. The player may activate one or more paylines up to the designated number of paylines associated with the reels in the game. A credits bet per payline display 112 indicates the number of credits or coins bet per each of the activated paylines in the game by the player. A total bet display indicates the total bet or wager made by the player in an activation or spin and is the product of the number of activated paylines multiplied by the number of credits bet per payline in that spin. A spin award display indicates the total award accumulated by the player in a particular spin in the game. The spin award indicated in the spin award display 116 includes any awards obtained by the player based on winning symbol combinations indicated by the paylines in the game and also any bonus awards associated with winning bonus symbol combinations indicated on the bonus payline in that spin. A total award or total credit display 118 indicates the player's total credits or the total credits possessed by the player at any point in the game.

Referring now to FIG. 3B, an award table 120 indicates the winning symbol combinations in a game and the awards associated with those winning symbol combinations. In one embodiment, the winning symbol combinations are indicated in column 122. The winning symbol combinations indicated in column 122 include combinations having the same or identical symbols. It should be appreciated that the winning symbol combinations may be any suitable winning symbol combinations desired by the game implementer. Column 124 in award table 120 indicates the awards associated with each of the winning symbol combinations indicated in column 122. For example, a winning symbol combination including five of the A symbols produces an award of five hundred. In one embodiment, the awards are award values or credits. It should be appreciated that the awards may be values, credits, prizes or any suitable type of award.

In one embodiment, the award table or pay table 120 is associated with any winning combinations of symbols indicated on the reels including any winning combinations of symbols indicated by the bonus payline. In another embodiment, an award table is associated with the winning combinations of symbols indicated on the reels and a different award table is associated with the winning combinations of symbols indicated by the bonus payline. It should be appreciated that one or more award tables or pay tables may be employed in a game. It should also be appreciated that the several different award tables may be employed in a game. The award tables may be based on winning combinations of symbols in a primary game, a bonus or secondary game, a combination of the primary and secondary games or any other suitable award table or pay table desired by the game implementor. In one embodiment, the pay table including the bonus awards and the corresponding winning combinations of symbols on the bonus payline are equal to the awards and corresponding winning combinations of symbols for a one-credit wager in the pay table associated with the paylines, regardless of the bet per payline made by the player in a game. It should be appreciated that the awards and corresponding winning combinations of symbols associated with any suitable wager amounts may be included in the pay table for winning combinations of symbols indicated by the bonus payline. In another embodiment, the awards and corresponding winning combinations of symbols in the pay table associated with the bonus payline are the same as the awards and corresponding winning combinations of symbols in the pay table associated with the paylines. In a further embodiment, the bonus awards in the pay table associated with the bonus payline are multiples of the awards in the pay table associated with the paylines. It should be appreciated that the multiple may be established by a player input, a third party input, the number of spins, a wager or bet per payline made by a player, the wager level or amount or may be randomly determined or predetermined in a game.

In another embodiment, the bonus award or awards include at least one free spin of the reels in the game. Therefore, a player may accumulate additional awards in the game using the free spin or spins from the bonus award. The bonus modifier modifies the number of free spins obtained from the bonus award to increase or decrease the number of free spins. In one aspect of this embodiment, the free spin or spins are used to spin the reels to indicate symbols on one or more of the paylines associated with the reels. In another embodiment, the free spin or spins are used to spin the reels to indicate symbols on one or more of the bonus paylines as described above. It should be appreciated that the number of free spins associated with the bonus award may be predetermined, randomly determined, based on a wager made by the player or based on any suitable determination method.

Referring now to FIG. 3C, in one embodiment, a bonus modifier table such as a bonus multiplier table 130 indicates the possible total bets made by a player in each spin in a game and the bonus multiplier associated with those total bets. Column 132 indicates the number of activated paylines in a spin (i.e., the number of paylines selected by or wagered on by the player in a spin of the reels). In this embodiment, a player can activate one, two or all three paylines associated with the reels. Column 134 indicates a number of credits bet or wagered per activated payline. In this embodiment, a player can wager up to five credits for each activated (i.e., selected) payline in a spin. Column 136 indicates the total bet for a spin, which is the number of activated paylines multiplied by the number of credits bet per payline in the spin. Column 138 indicates the bonus multipliers associated with the different total bets made by a player in a spin or spins. In this embodiment, the bonus multiplier equals the total bet multiplied by a factor of two. It should be appreciated that the bonus multiplier may be directly based on the total bet. It should also be appreciated that any suitable factor may be used to multiply the total bet. The factor may be randomly determined, predetermined, based on a wager level in the game or based on any suitable characteristic of the game. As shown in Column 138, the bonus multiplier increases significantly as the total bet in a spin increases.

Turning now to FIG. 4A to 4E, an example of the embodiment of FIGS. 3A and 3B is illustrated where a player begins the game with one hundred credits as indicated by the total credit display 218. In this example, the gaming device provides the player with five reels, 34*a*, 34*b*, 34*c*, 34*d* and 34*e*. The reels include a plurality of symbols A, B, C, D, E, F, G, H and I. The reels also include at least one wild symbol 203 and at least one bonus payline symbol 200. Additionally, the gaming device provides a bonus symbol display 204 including five bonus symbol indicators, 206*a*, 206*b*, 206*c*, 206*d* and 206*e*. In this example, the bonus symbol indicators 206 indicate the bonus payline symbols indicated on the reels in a spin. The bonus symbol indicators reset prior to each subsequent spin. In addition, paylines 56*a*, 56*b* and 56*c* are associated with the reels 34 and indicate winning symbol combinations in the game. In this example, the winning symbol combinations may be indicated on any one of the single paylines 56 but are not indicated on all of the paylines (i.e., no scatter pay combinations). Also, the gaming device only provides the largest award associated with any winning symbol combinations indicated on the paylines regardless of whether several winning combinations of symbols are indicated on more than one of the paylines. For example in a game, the awards associated with winning symbols combinations indicated on a first payline, a second payline and a third payline associated with a set of reels are one hundred, two hundred and fifty, respectively. The gaming device only provides the player with the award of two hundred associated with the second payline because this is the largest award of all of the awards associated with the winning symbol combinations indicated by the paylines.

Figure 4A:
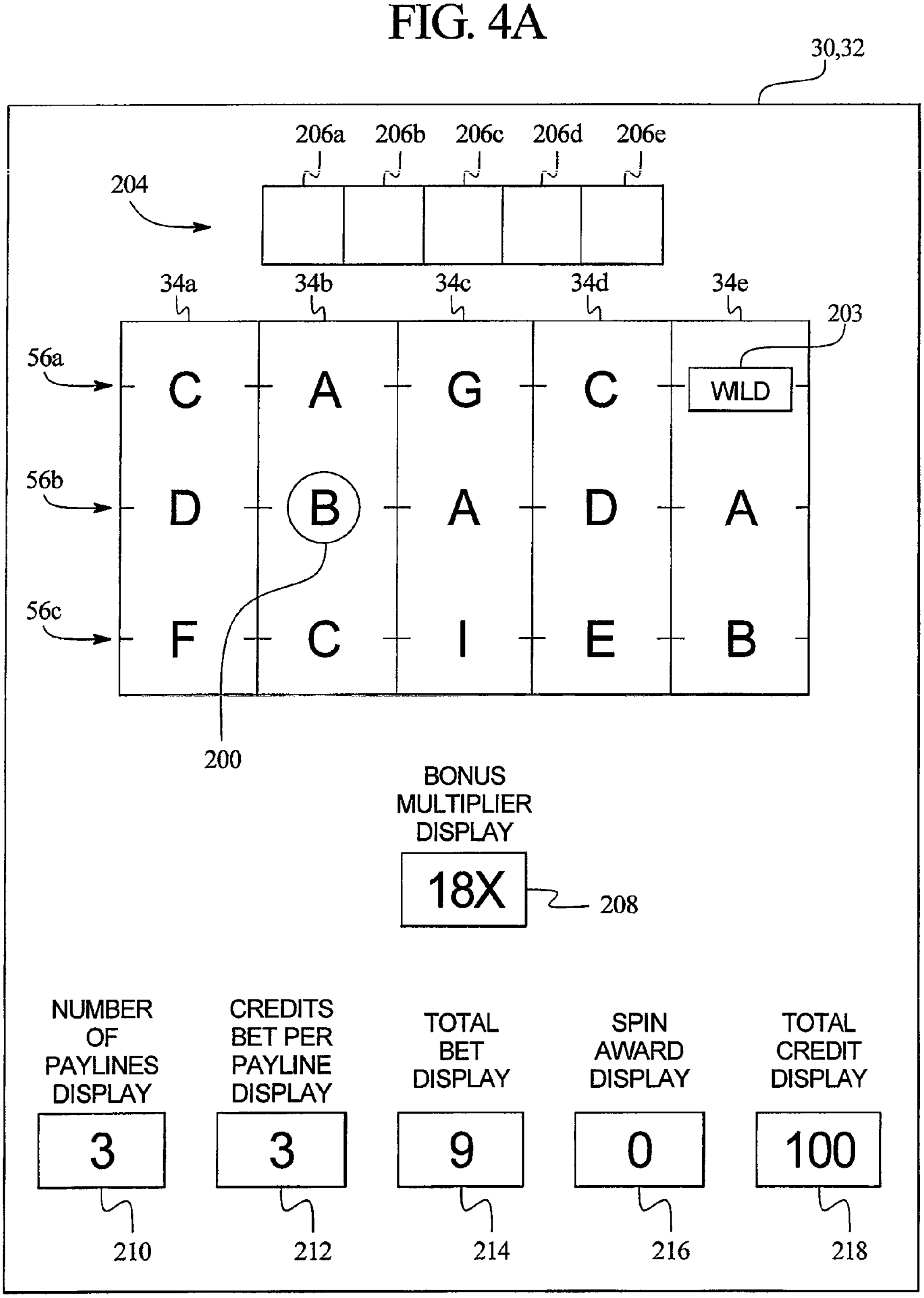
FIGS. 4A to 4E are enlarged front elevation views illustrating an example of the embodiment of FIGS. 3A and 3B.

A bonus multiplier display 208 indicates the bonus multiplier provided to a player in each spin. Additionally, a number of paylines display indicates the number of paylines selected and activated by the player or the number of paylines wagered on by the player in a game. A credits spent per payline display 212 indicates the number of credits bet by the player on each payline in the game. A total bet display 214 indicates the total bet placed by the player in each spin and is the product of the number of paylines indicated in the number of paylines display 210 and the number of credits bet per payline indicating the number of credits in the credits bet per payline display 212. A spin award display 216 indicates the total award accumulated by the player in that spin including the awards associated with any winning symbol combinations indicated on the paylines and any bonus awards associated with winning combinations of symbols indicated by the bonus payline in a spin. A total credit display 218 indicates the total credits possessed by the player at any point in the game. As shown in FIG. 4A, the player's total credits are one hundred to begin the game as indicated by the total credit meter or total credit display 218. The total credits may be credits transferred from a previous game or games or based on money inputted by the player into the gaming machine.

Figure 4B:
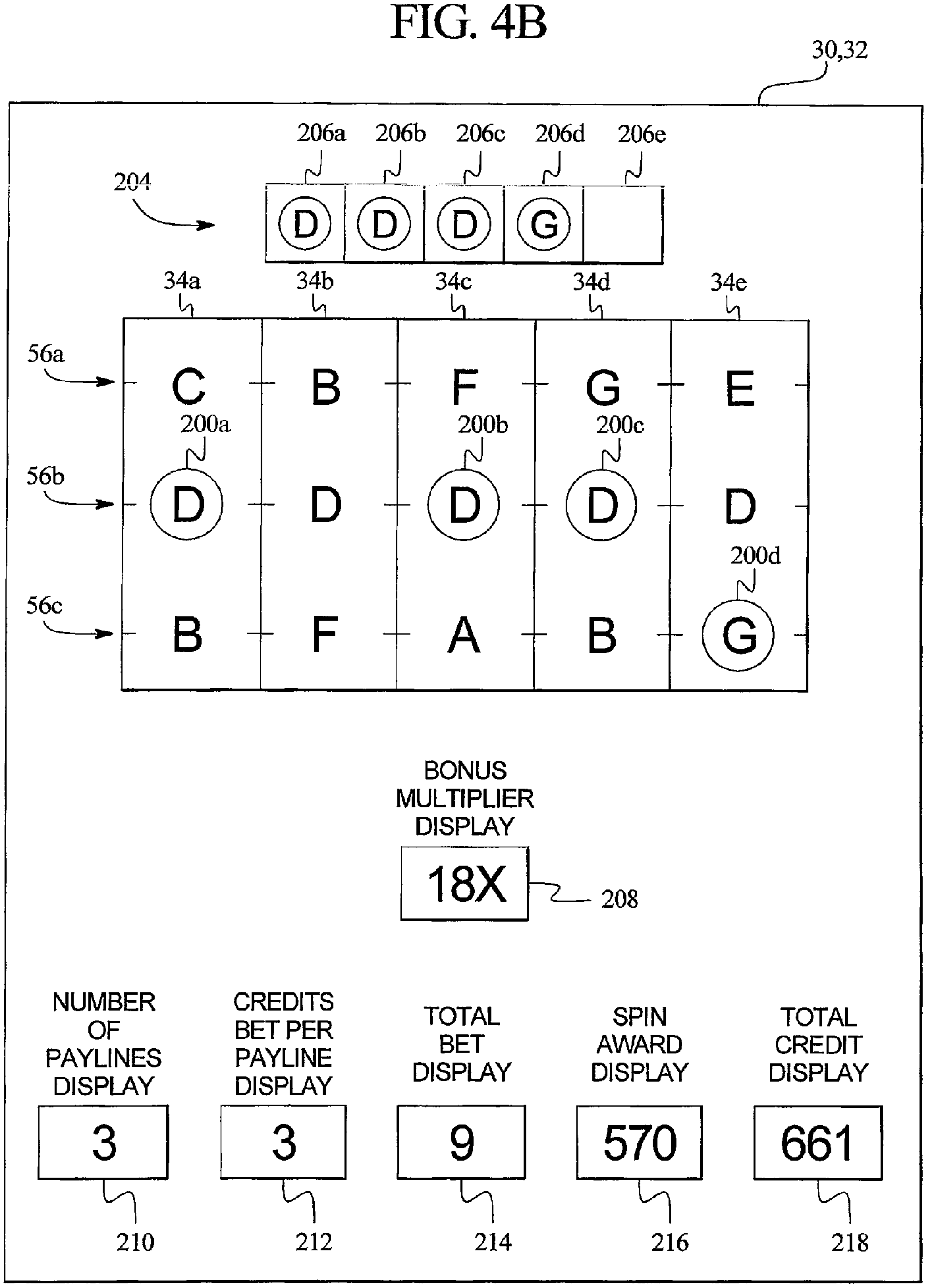

Referring to FIG. 4B, the gaming device or player spins the reels 34 for the first time in the game. Because the player bet a total bet of nine for that spin as indicated in the total bet display 214, the gaming device deducts or subtracts the total bet of nine from the total credits of one hundred to give the player a total credit amount of ninety-one (not shown). The reels stop spinning and indicate a winning combination of symbols including five D symbols on payline 56*b*. In this example, the winning symbol combinations include any bonus payline symbols 200 indicated on the same payline on the reels. Additionally, the gaming device evaluates the symbols indicated on the payline and also the bonus payline to determine a winning combination of symbols regardless of the order of the symbols on the payline. For example, a combination of A-A-B-A is a winning combination of three A symbols on a payline in a spin, regardless of the order of the three A symbols on the payline.

As indicated in FIGS. 3B and 4B, the winning combination of five D symbols indicated on payline 56*b* provides an award of one hundred. Additionally, the reels indicate four bonus payline symbols 200*a*, 200*b*, 200*c* and 200*d* on the reels. In this example, the bonus payline symbols do not have to appear on a single payline to be provided to the player in the game. The bonus payline symbols indicated on the reels are copied or transferred to the bonus symbol display 204 to form the bonus payline. Each bonus symbol 200 is placed or displayed by one of the bonus symbol indicators 206. As shown by bonus symbol display 204, bonus payline symbol 200*a* is displayed in bonus symbol indicator 206*a*, bonus payline symbol 200*b* is displayed in bonus symbol indicator 206*b*, bonus payline symbol 200*c* is displayed in bonus symbol indicator 206*c*, and bonus payline symbol 200*d* is displayed in bonus symbol indicator 206*d*. The gaming device now evaluates or determines if the combination of bonus payline symbols indicated by the bonus symbol display 204 is a winning symbol combination. In this example, the winning symbol combinations indicated in the award table in FIG. 3B are the winning symbol combinations for any symbols (including the bonus payline symbols) in the game. Therefore, the gaming device determines if the bonus payline symbols indicated in the bonus symbol display 204 indicate a winning combination in the game based on the winning symbol combinations included in the award table 120 and FIG. 3B. The combination of symbols including three D symbols is a winning symbol combination having an associated award of fifteen as indicated by award table 120. Therefore, the gaming device provides a bonus award of fifteen to the player. The bonus award of fifteen is multiplied by the bonus multiplier 18X as indicated by the bonus multiplier display 208. In this example, the bonus multiplier 18X is determined by taking the number of paylines indicated in the number of paylines display 210 multiplied by the number of credits bet per payline as indicated in the credits bet per payline display 212 (i.e., or the total bet indicated in the total display 214) and then multiplied by a factor of two. The multiplied bonus award equals the bonus award of fifteen multiplied by the bonus multiplier of eighteen (i.e., 18X), which provides an award of two hundred seventy. The bonus award of two hundred seventy is added to the award of three hundred to provide a total spin award of five hundred seventy as indicated in the spin award display 216. The spin award or credits indicated in the spin award display 216 are added to the player's total credits to achieve a new total number of credits of six hundred sixty-one as indicated in the total credit display 218.

Figure 4C:
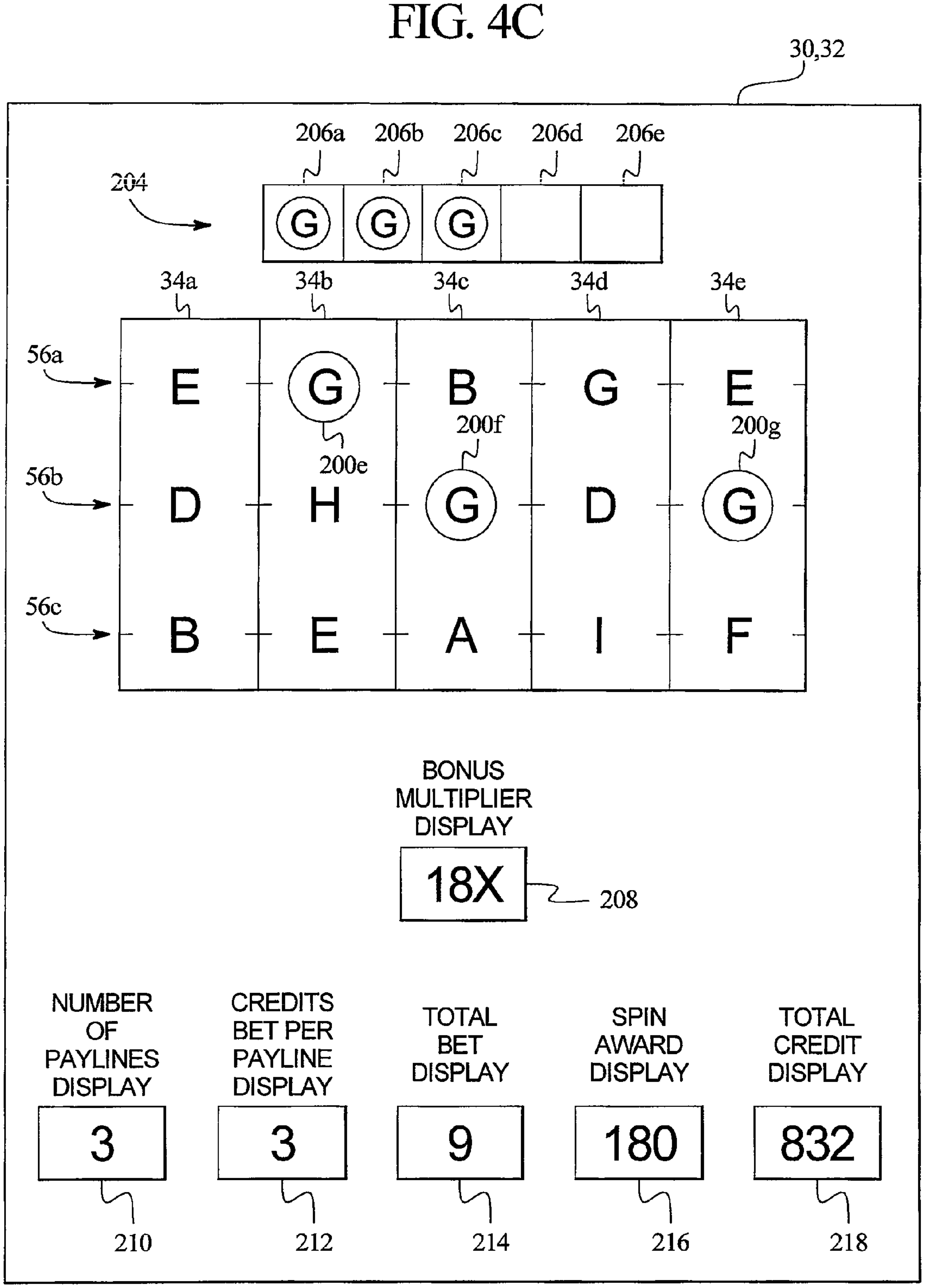

Referring to FIG. 4C, the player has available credits as indicated by the total credit display 218 and therefore chooses to continue to play the game. Thus, the player activates or spins the reels for a second time in the game. The number of paylines wagered on by the player remains at three as indicated by the number of paylines display 210 and the number of credits bet or wagered on per payline also remains at three as indicated by the credits bet per payline display 212. The total bet for this spin remains at nine as indicated by the total bet display 214. The total bet or wager of nine is deducted or subtracted from the total number of credits indicated in the total credit display 218 after the player activates or spins the reels. The total credits changes from six hundred sixty-one to six hundred fifty-two (not shown) after the player activates the reels. After the reels stop spinning, the reels do not indicate a winning combination of symbols on any of the paylines 56. However, the reels do indicate three bonus payline symbols 200. The bonus payline symbols 200*e*, 200*f* and 200*g* are transferred and displayed in the bonus symbol display 204. Specifically, bonus payline symbol 200*e* is transferred and displayed in bonus symbol indicator 206*a*, bonus payline symbol 200*f* is transferred and displayed in bonus symbol indicator 206*b* and bonus payline symbol 200*g* is transferred and displayed in bonus symbol indicator 206*c*. The gaming device then evaluates the bonus payline symbols indicated in the bonus symbol display 204 to determine if these symbols form a winning combination. In this game, the winning combinations associated with the bonus payline symbols are the same as the winning combinations associated with the other symbols in the game. Therefore, a combination of three G symbols provides an award of ten as indicated by the award table 120 in FIG. 3B. Additionally, as described above, the bonus multiplier remains at 18X as indicated by the bonus multiplier display 208. The bonus award of ten associated with the winning combination of bonus payline symbols is multiplied by the bonus multiplier of 18X to provide a spin award of one hundred eighty as indicated by the spin award display 216. The spin award is then added to the player's total credits to achieve a new total number of credits of eight hundred thirty two as indicated by the total credit display 218.

Figure 4D:
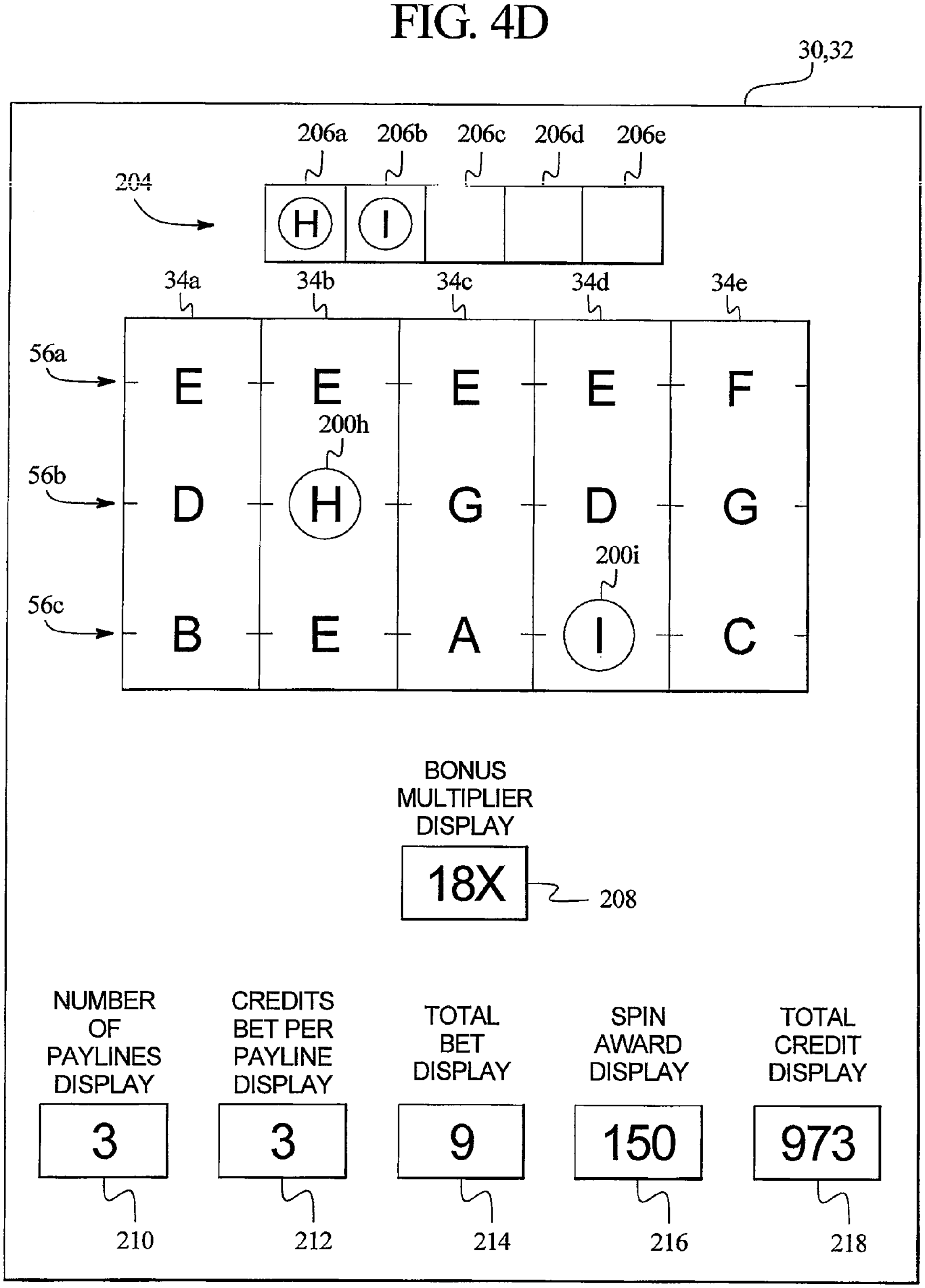

Referring now to FIG. 4D, the player still has credits remaining as indicated by the total credit display 218 and therefore the player chooses to continue playing the game. The player activates or spins the reels for a third time in the game. As with the previous spin, the player did not change the number of paylines wagered on in the game or the number of credits bet or wagered on per payline in the game as indicated by displays 210 and 212. Therefore, the total bet or wager for this spin is nine as indicated by the total bet display 214. The player's total number of credits changes from eight hundred thirty-two to eight hundred twenty-three (not shown) after the reels are activated by the player. After the reels stop spinning, a winning combination of symbols including four E symbols are indicated on payline 56*a*. The winning combination including four E symbols is associated with an award of fifty as indicated in column 124 of award table 120 in FIG. 3B. The award of fifty is then multiplied by the number of credits bet for that payline 56*a*, which is three. The award therefore becomes an award of one hundred fifty. Additionally, two bonus payline symbols 200*h* and 200*i* are indicated on the reels. Bonus symbol 200*h* is transferred to the bonus symbol indicator 206*a* in bonus symbol display 204 and bonus payline symbol 200*i* is transferred and displayed in bonus symbol indicator 206*b*. The gaming device then evaluates the bonus payline symbols indicated in the bonus symbol display to determine if these symbols indicate a winning combination of symbols. The combination of an H symbol and an I symbol do not form a winning combination of symbols in the game. Therefore the gaming device does not provide a bonus award to the player in this spin. The total spin award is therefore one hundred fifty as indicated by the spin award display 216. The spin award is then added to the player's total credits to provide the player with a new total number of credits of nine hundred seventy-three as indicated by the total credit display 218.

Figure 4E:
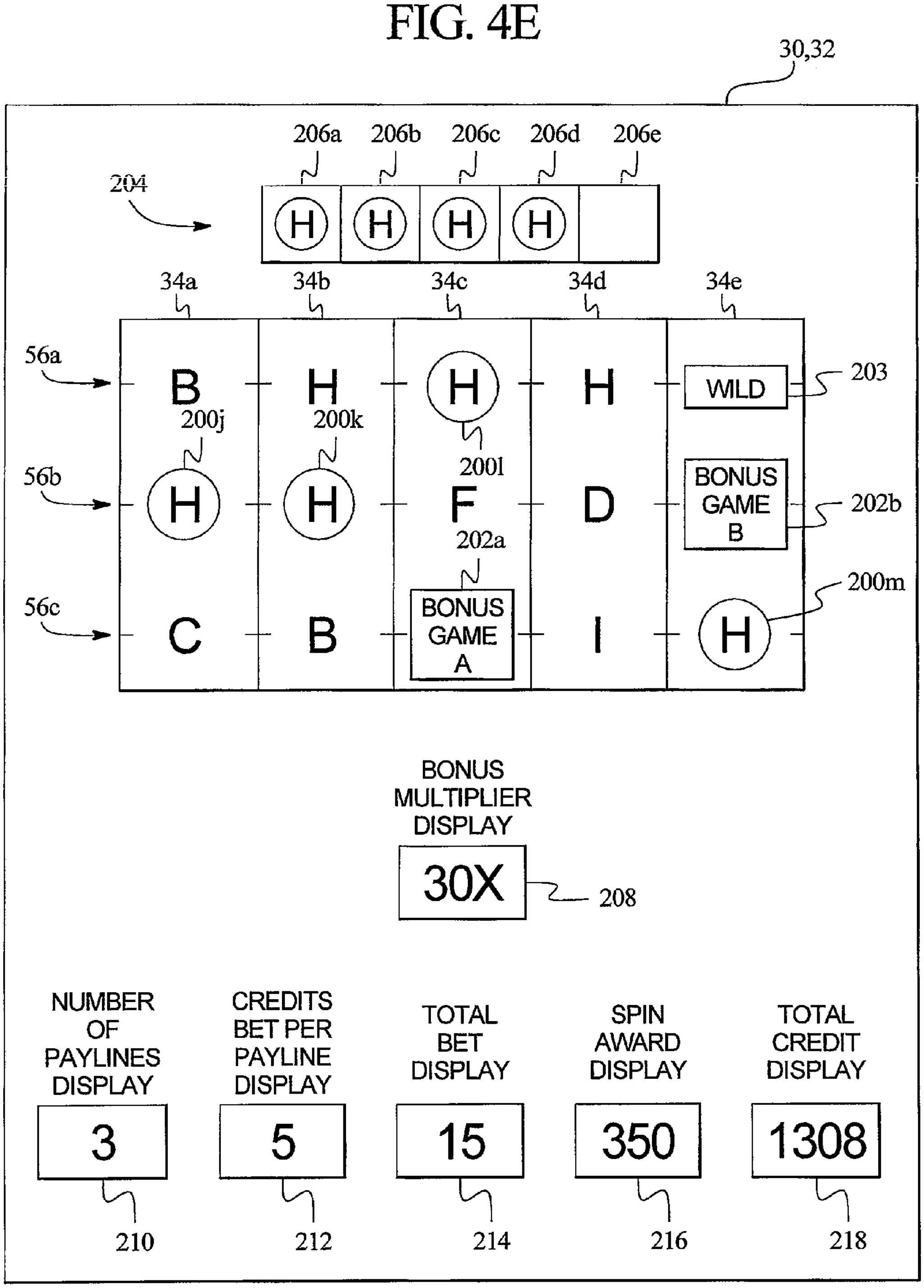

Referring now to FIG. 4E, the player still has credits remaining as indicated by the total credit display 218 and therefore the player again chooses to continue playing the game. The player activates or spins the reels for a fourth time in the game. Prior to spinning the reels, the player increases the number of credits bet or wagered on per each of the three paylines selected and activated by the player in the game. The player increases the number of credits bet per payline from three to five as indicated in credits bet per payline display 212. The total wager or bet for this spin therefore becomes fifteen as indicated by the total bet display 214. The total bet of fifteen for the spin is subtracted from the total credits indicated in the total credit display 218 after the reels are activated for the spin to change the total credits from nine hundred seventy-three to nine hundred fifty-eight (not shown). After the reels stop spinning, the reels indicate a winning combination of four H symbols as indicated on payline 56*a*. The winning combination includes wild symbol 203, which represents any one of the symbols on the reels in the game. The three H symbols indicated on payline 56*a* are combined with the wild symbol 203 to form a winning combination of four H symbols. This winning combination has an associated award of ten as indicated in the award table 120 in Fig. B. The award of ten is then multiplied by the number of credits bet for this payline which is five as indicated in display 212. The modified award is therefore an award of fifty. Additionally, four bonus payline symbols 200*j*, 200*k*, 200*l*, and 200*m* are indicated on the reels. Bonus payline symbol 200*j* is transferred and displayed in bonus indicator symbol 206*a* and bonus symbol display 204, bonus payline symbol 200*k* is transferred and displayed in bonus indicator symbol 206*b*, bonus payline symbol 200*l* is transferred and displayed in bonus indicator symbol 206*c*, and bonus payline symbol 200*m* is transferred and displayed in bonus symbol indicator 206*d*.

The combination of the four H symbols displayed in bonus symbol display 204 form the bonus or additional payline in the game. The gaming device evaluates the combination of four H symbols to determine if this is a winning combination of symbols in the game. As stated above, a combination including four H symbols is a winning combination in the game and provides an award of ten as indicated in the award table 120 in FIG. 3B. The award of ten is multiplied by the bonus multiplier indicated in the bonus multiplier display 208, which is 30X. The bonus award is therefore the award associated with the winning combination of four H symbols of ten, multiplied by the bonus multiplier of thirty, which produces a bonus award of three hundred. The award of three hundred is the spin award and is indicated in the spin award display 216. The spin award is added to the total number of credits to provide the player with a new total number of credits of one thousand three hundred eight as indicated by the total credit display 218. The player chooses to stop playing the game and "cash out" or receive the total number of credits. Therefore, the game ends when the player presses the cash out button or pay button and the gaming device provides the total credits of one thousand three hundred eight credits to the player as indicated by the total credit display 218. It should be appreciated that the player preferably does not need to wager on the bonus or additional payline to activate such payline. Although in an alternative embodiment, the gaming device may enable a player to wager upon the bonus or additional payline.

Figure 5:
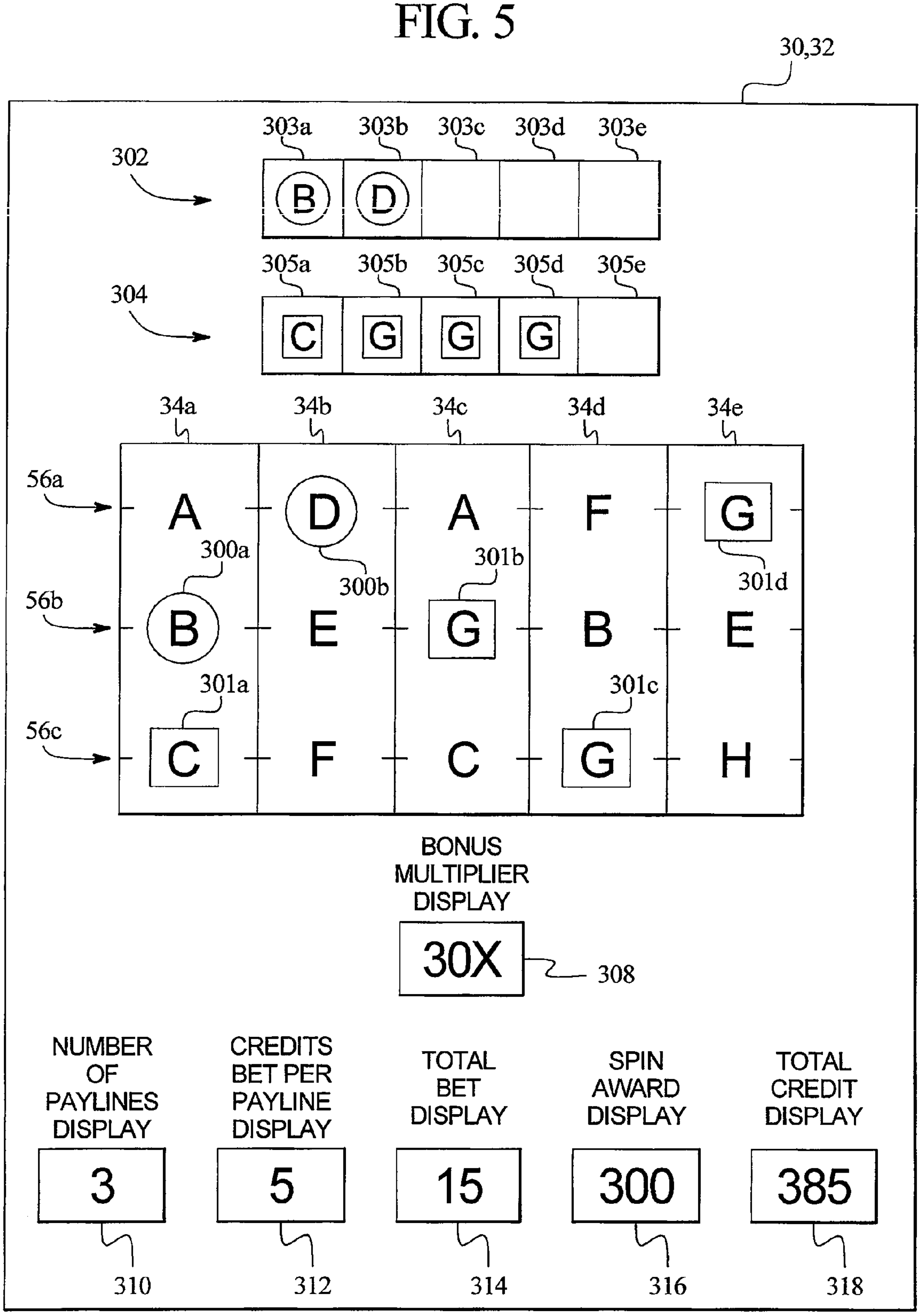
FIG. 5 is an enlarged elevation view of another embodiment of the gaming device of the present invention where multiple bonus paylines are employed in a game.

Referring now to FIG. 5, another embodiment of the present invention is illustrated where a plurality of bonus paylines are formed in a game. As shown in FIG. 5, the gaming device provides two bonus symbol displays or bonus paylines 302 and 304. The bonus symbol displays may be displayed above the reels (as shown in FIG. 5), below the reels or in any suitable location on the display devices 30 or 32. In this embodiment, bonus symbol display 302 includes bonus symbol indicators 303*a*, 303*b*, 303*c*, 303*d* and 303*e*. The bonus symbol indicators 303 in bonus symbol display 302 display one type of bonus symbol indicated on the reels, represented by a symbol enclosed by a circle. Any bonus payline symbols such as 300*a* and 300*b* indicated on the reels are copied or transferred and displayed in the bonus symbol display 302. Bonus symbol display 304 displays a different bonus payline symbol indicated on the reels in the game. Bonus symbol display 304 displays the symbols enclosed with a square such as bonus payline symbols 301*a*, 301*b*, 301*c* and 301*d*. These bonus symbols are copied or transferred and displayed in bonus symbol display indicator 305*a*, 305*b*, 305*c*, 305*d* and 305*e* in bonus symbol display 304. It should be appreciated that a game may include one or a plurality of bonus paylines or bonus symbol displays such as bonus symbol displays 302 and 304 in a game. In this embodiment, the gaming device displays bonus payline symbols 300 in bonus symbol display 302 and bonus payline symbols 301 in bonus symbol display 304. The gaming device then evaluates the bonus payline symbols, which form each of the bonus paylines 302 and 304, respectively, to determine if any winning combinations of symbols are indicated on these bonus paylines. For example, bonus payline symbol 300*a* and bonus payline symbol 300*b* displayed in bonus symbol display 302 do not indicate a winning combination of symbols in the game. However, bonus payline symbols 301*a*, 301*b*, 301*c* and 301*d* indicate a winning combination of symbols including three G symbols. The winning combination of three G symbols is associated with an award of ten and is multiplied by the bonus multiplier indicated in the bonus multiplier display 308, which is thirty (i.e., 30X). In this example, therefore, the spin award is an award of three hundred as indicated by the spin award display 316. In another embodiment, the gaming device evaluates the symbols on all of the bonus paylines to determine if a scatter pay winning combination of the symbols is indicated by the bonus paylines.

In another embodiment, the gaming device includes a plurality of bonus paylines or bonus symbol displays to indicate the same bonus payline symbols in a game. In this embodiment, any bonus payline symbols indicated on the reels in a spin are randomly transferred and displayed in each of the bonus paylines or bonus symbol displays. In one aspect of this embodiment, the bonus payline symbols indicated on the reels are used to form one or more of the bonus paylines represented by the bonus payline displays. For example, a game includes three bonus payline displays. In the game, a combination of three bonus payline symbols A*-A*-A* are indicated on the reels. The combination of bonus payline symbols A*-A*-A* are used to form all three of the bonus paylines in the game. Thus, each bonus payline includes the combination of A*-A*-A*. It should be appreciated that the indicated bonus payline symbols may form one, a plurality or all of the bonus paylines represented by the bonus symbol displays in a game. Once the bonus paylines are formed, the gaming device then evaluates the bonus payline symbols indicated by each of the bonus paylines to determine if there are any winning combinations of symbols indicated by each of the paylines. The gaming device then provides an award or awards associated with any winning symbol combinations on the bonus paylines. The gaming device then resets the bonus paylines or bonus symbol displays prior to the next spin.

In a further embodiment, any bonus payline symbols indicated on a reel in a spin are transferred and displayed on one or more of the bonus paylines or bonus symbol displays and maintained in the bonus symbol displays for a plurality of spins. This enables a player to accumulate bonus payline symbols and obtain additional awards in the game. The number of spins before the gaming device resets the bonus symbol displays may be randomly determined, predetermined, determined based on a wager made by the player or determined in any suitable determination method.

Figure 6:
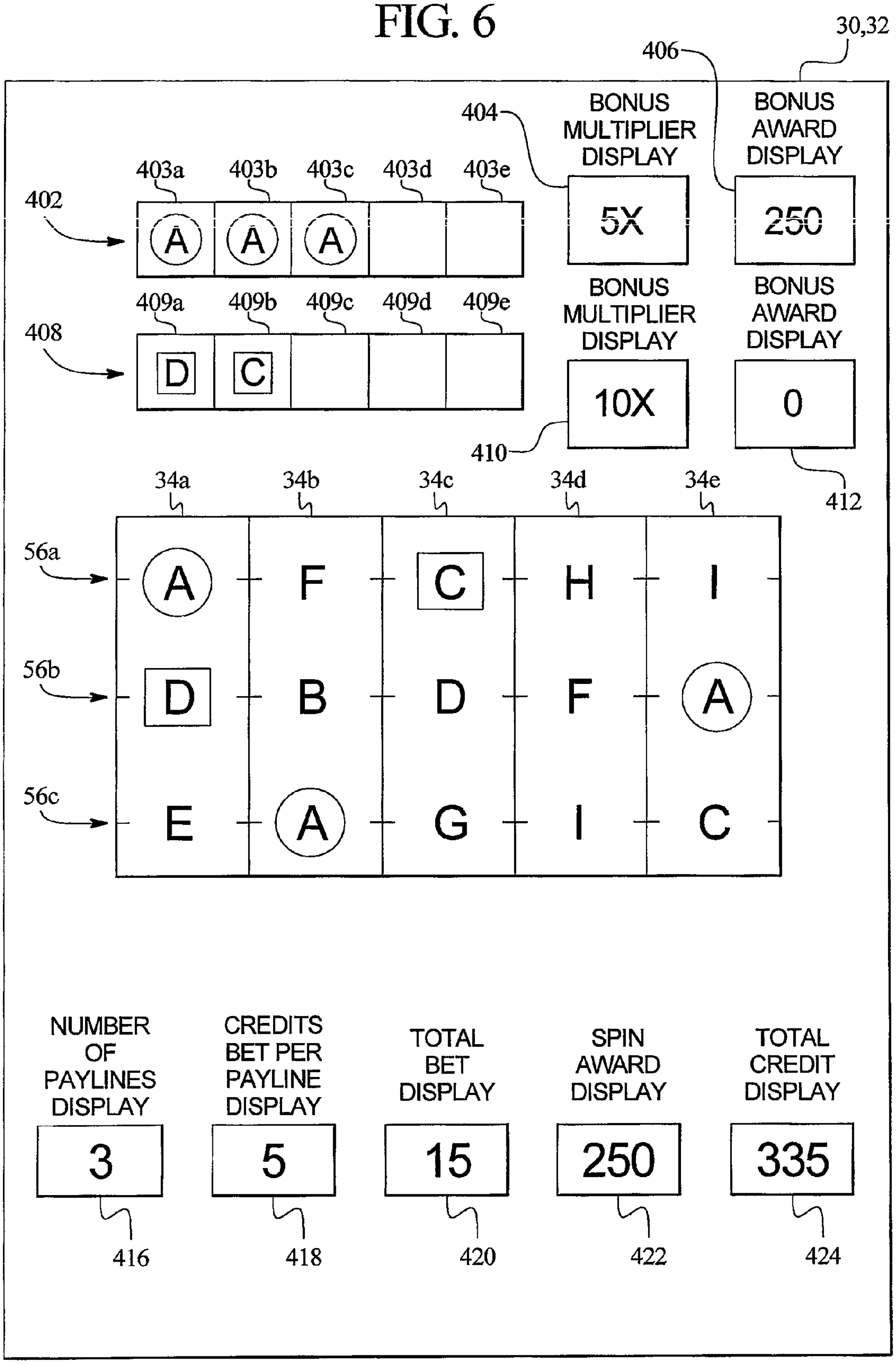
FIG. 6 is a further embodiment of the gaming device of the present invention where multiple bonus paylines are employed in the game and a bonus multiplier is associated with each of the bonus paylines.

Referring to FIG. 6, a further embodiment of the present invention is illustrated where the gaming device includes a plurality of bonus paylines or bonus symbol displays and a bonus multiplier is associated with each of the bonus paylines in the game. In this embodiment, any winning symbol combinations indicated by the bonus symbols on the bonus paylines 402 or 408 are multiplied by the bonus multipliers indicated in the bonus multiplier displays 404 and 410, respectively. A multiplied award is then displayed in the bonus award displays 406 and 412. These awards are then transferred to the spin award display 422. In this embodiment, the bonus multipliers associated with each of the bonus paylines 402 and 408 are randomly determined. The bonus multiplier may be the same bonus multiplier for each of the paylines, at least two of the bonus multipliers may be different or all of the bonus multipliers may be different. Additionally in one embodiment, the bonus multipliers are determined based on a linear progression including a wager made by the player. Therefore, the bonus multipliers are determined based on the amount of the player's wager. It should be appreciated that the bonus multipliers may be randomly determined, predetermined, based on a wager made by the player, or determined according to any other suitable determination method desired by the game implementor. In one embodiment, the gaming device sums the bonus awards associated with each winning combination of symbols indicated by the plurality of bonus paylines to achieve a total award and provides the total award to a player. In another embodiment, the gaming device determines the largest award associated with all of the winning combinations of symbols indicated by the bonus paylines and provides that award to the player.

Figure 7:
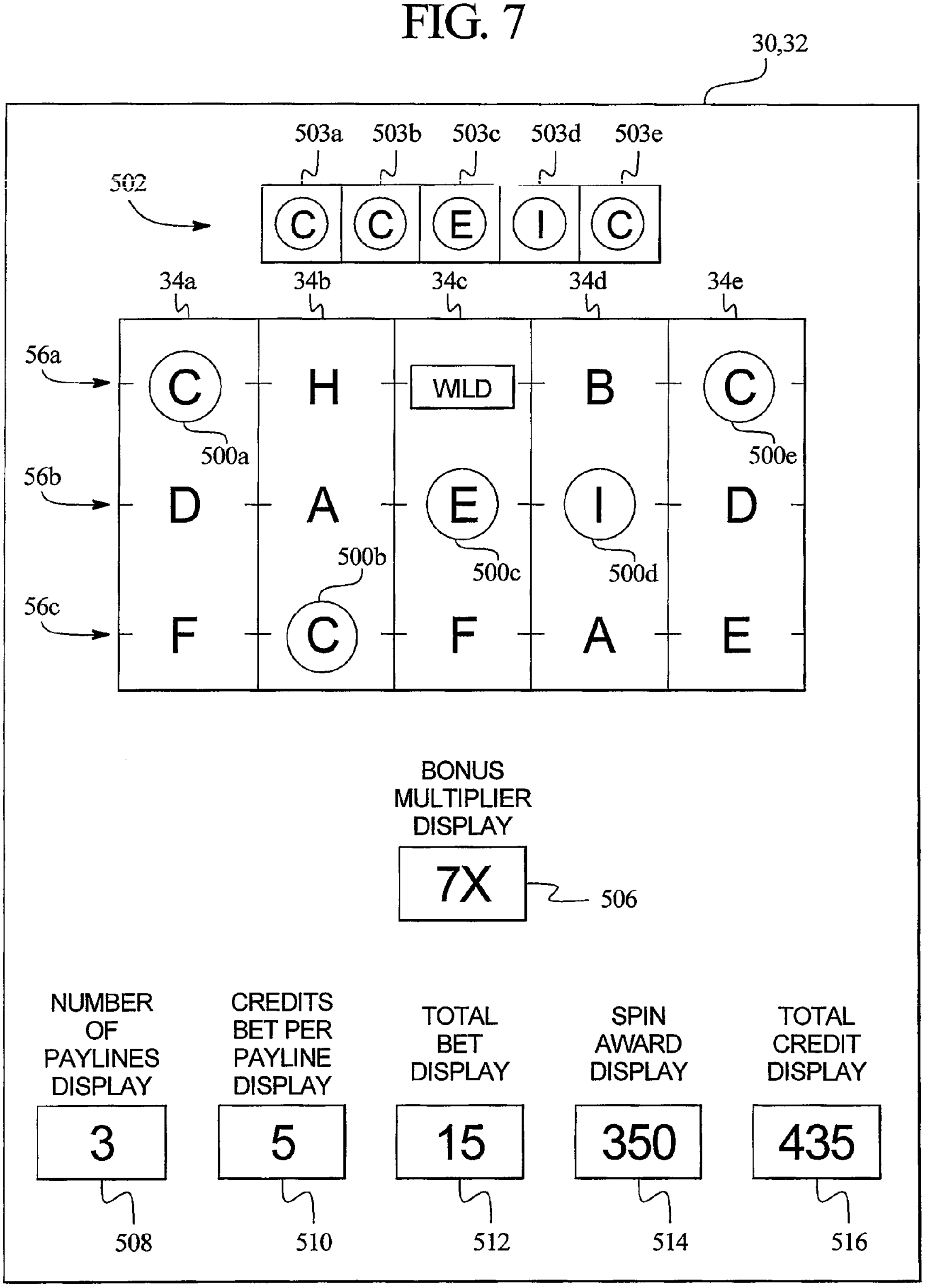
FIG. 7 is an enlarged elevation view of another embodiment of the gaming device of the present invention where the bonus multiplier is based on the bonus symbols indicated on the reels in the game.

Referring now to FIG. 7, another embodiment of the present invention is illustrated where the bonus multiplier associated with the bonus payline is based on the number of bonus payline symbols 500 indicated on the reels in a game. In this embodiment, the bonus payline symbols indicated on the reels determine the bonus multiplier for that spin. In one embodiment, the bonus multiplier initially begins the game or the spin at a predetermined value such as 2X. It should be appreciated that the bonus multiplier may be any suitable multiplier value prior to a spin. Furthermore, the initial bonus multiplier may be randomly determined, predetermined, determined based on a wager made by the player or any other suitable determination method. In this embodiment, the base or initial bonus multiplier then increases by a predetermined amount such as one for each bonus payline symbol indicated on the reels in a spin. For example, the bonus multiplier in FIG. 7 initially was set at 2X prior to the gaming device or player spinning the reels. After the wheel stops spinning, five bonus payline symbols 500*a*, 500*b*, 500*c*, 500*d* and 500*e* are indicated on the reels. Thus, the bonus multiplier of 2X is increased by one for each of the bonus payline symbols indicated on the reels and therefore becomes a bonus multiplier of 7X for that spin as indicated in the bonus multiplier display 506. It should be appreciated that the bonus multiplier may be increased, decreased or remain unchanged in one or more spins of the reels in a game. Additionally, the bonus multiplier may increase or decrease by a randomly determined amount or a predetermined amount for each of the bonus payline symbols indicated on the reels in a spin or spins. Moreover, the bonus multiplier may increase or decrease based on each bonus payline symbol indicated on the reels or a plurality of bonus symbols indicated on the reels in a spin or spins. The bonus multiplier may also increase or decrease based on the amount of the wager made by a player or a wager level in the game. For example, a wager of five provides a bonus multiplier of 5X and a wager of ten provides a bonus multiplier of 10X.

In another embodiment, the symbols include at least one modifier symbol which modifies the bonus modifier in a spin. In this embodiment, if the modifier symbol is indicated on the reels, the bonus modifier is modified. The bonus modifier may increase, decrease or remain unchanged when the modifier symbol is indicated on the reels. In addition, the bonus modifier may change by a predetermined amount or a random amount. The modifier symbol may also change the bonus modifier in one spin, a plurality of spins or in all of the spins in a game.

Figure 8:
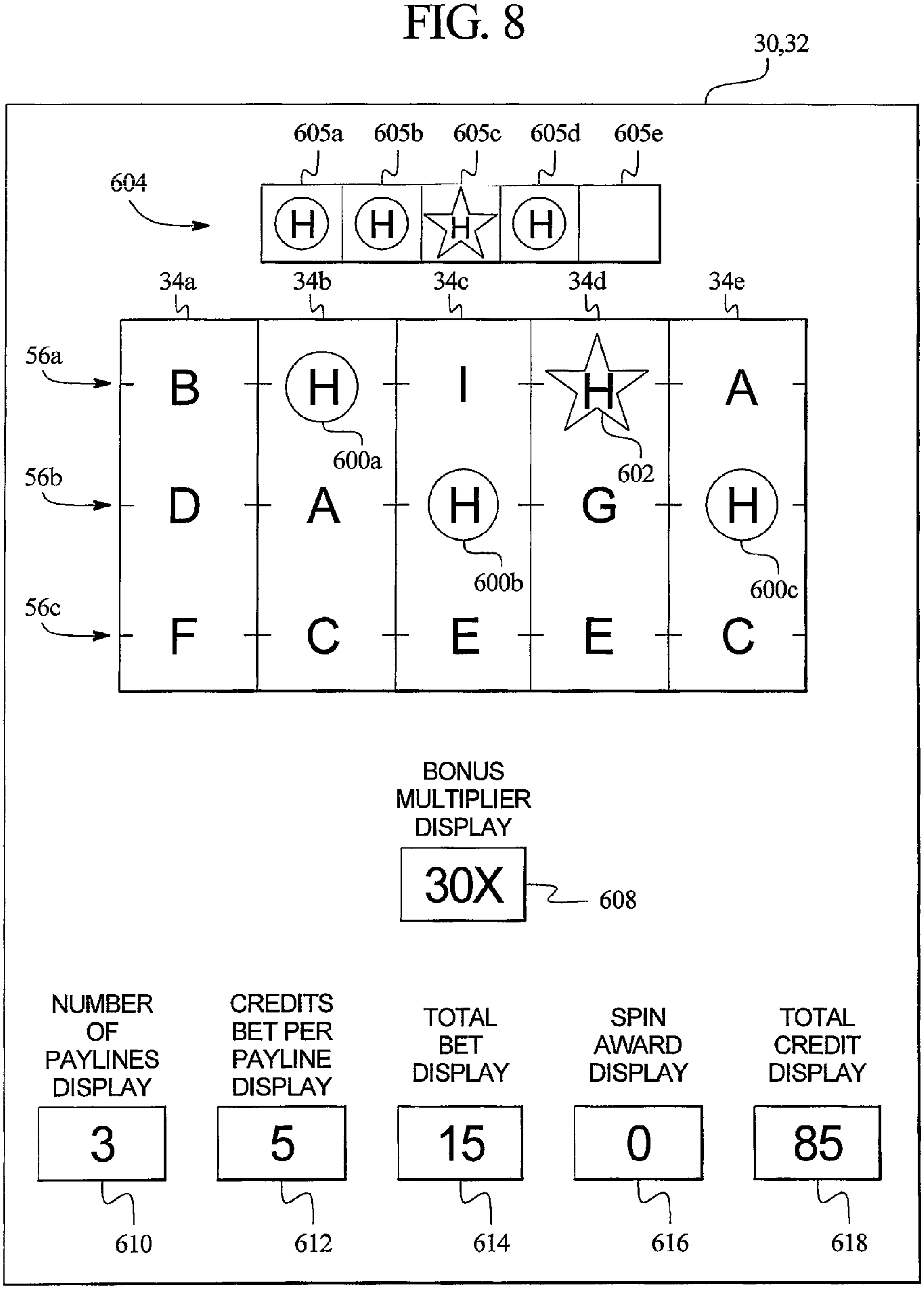
FIG. 8 is an enlarged elevation view of a further embodiment of the gaming device of the present invention where the reels include different bonus symbols that determine a bonus award in the game.

Referring now to FIG. 8, another embodiment of the present invention is illustrated where the gaming device includes different bonus payline symbols such as "winner" bonus payline symbols and "loser" bonus payline symbols. In this embodiment, in each spin, the reels indicate symbols, which may include one or more winner bonus payline symbols and one or more loser bonus payline symbols. Both the winner and loser bonus payline symbols indicated on the reels in a spin are transferred and displayed on the bonus payline or bonus symbol display. The gaming device then evaluates if any loser bonus payline symbols are included in the combination of bonus payline symbols on the bonus payline. If the bonus payline includes one or more loser symbols, the gaming device does not provide a bonus award to the player in that spin, regardless if a winning combination of symbols are indicated on the payline. If the bonus payline indicates all winner bonus payline symbols (and no loser bonus payline symbols) the gaming device evaluates the combination of these winner bonus payline symbols to determine if a winning combination is indicated by the symbols. If the winner bonus payline symbols indicate a winning combination, the gaming device provides the award associated with that winning combination to the player in the spin. For example, in FIG. 8, the gaming device includes a plurality of winner bonus payline symbols 600 and a plurality of loser bonus payline symbols 602. The gaming device spins the reels and the reels indicate three winner bonus payline symbols 600*a*, 600*b* and 600*c* and one loser bonus payline symbol 602. The winner and loser bonus payline symbols 600 and 602, respectively, are transferred and displayed on the bonus payline or bonus symbol display 604. The gaming device then evaluates the combination of bonus payline symbols on the bonus payline to determine if any loser bonus payline symbols 602 are indicated in the combination. In this example, one loser bonus payline symbol 602 is indicated on the bonus payline or in bonus symbol display 604, and therefore, the gaming device deactivates or does not provide a bonus award associated with those symbols in the spin, even though the combination of bonus payline symbols on the payline include four H symbols (i.e., a winning combination of symbols). Although the bonus payline symbols are referred to as winner bonus payline symbols and loser bonus payline symbols, the different bonus payline symbols may be designated in any suitable manner.

In another aspect of this embodiment, the symbols include a plurality of bonus payline symbols and at least one bonus activator symbol or activator symbol. In this embodiment, any bonus payline symbols and bonus activator symbols indicated on the reels form a bonus payline in a game. The gaming device evaluates the bonus payline symbols indicated on the bonus payline to determine if a bonus activator symbol is included in those symbols. If the symbols do not include a bonus activator symbol, the gaming device does not provide a bonus award to the player for that spin. Thus, the bonus activator symbol activates the bonus payline in the game and enables the player to obtain a bonus award if the symbols indicated on the bonus payline indicate a winning combination of symbols. Alternatively, the bonus payline symbols may include a de-activator symbol instead of an activator symbol, where the de-activator symbol de-activates the bonus payline when the de-activator symbol is indicated by the symbols that form the bonus payline.

Figure 9:
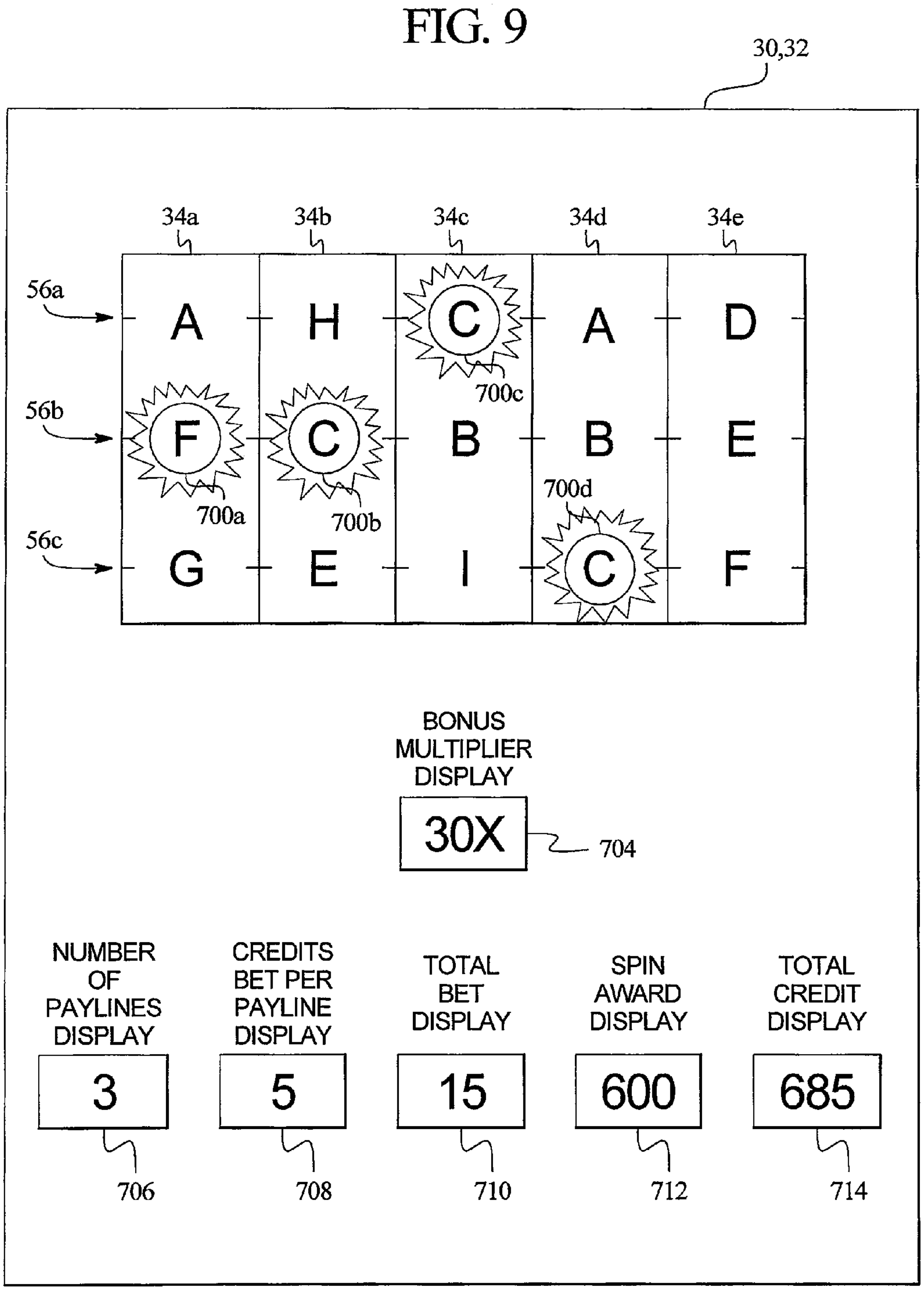
FIG. 9 is an enlarged elevation view of another embodiment of the gaming device of the present invention where the bonus payline is formed on the reels.

Referring now to FIG. 9, a further embodiment of the present invention is illustrated where the gaming device highlights the bonus payline symbols indicated on the reels in a spin. In this embodiment, the bonus payline symbols indicated on the reels in a spin do not form a bonus payline or are not transferred and displayed in a separate bonus symbol display or bonus payline such as the bonus symbol display 104 in FIG. 3B. Instead, the bonus payline symbols are highlighted on the reels when the bonus payline symbols appear on the reels in a spin. For example, bonus payline symbols 700*a*, 700*b*, 700*c* and 700*d* are indicated on the reels after a spin and are thereby highlighted by the gaming device to indicate those symbols. The bonus payline symbols on the reels form the bonus payline in this spin and the gaming device evaluates these symbols included on the bonus payline to determine if any winning symbol combinations are indicated by the highlighted bonus payline symbols. As shown in FIG. 9, the bonus payline symbols are highlighted or illuminated on the reels and include three C symbols. In this embodiment, the combinations of symbols indicated by the paylines are evaluated regardless of the order of the symbols on the paylines. Therefore, the combination of the highlighted bonus payline symbols F-C-C-C indicate a winning symbol combination of three C symbols as shown in the award table 120 in FIG. 3B. In one embodiment, the bonus payline symbols are highlighted using one or more illumination or mechanisms devices associated with the reels. In another embodiment, the bonus payline symbols indicated on the reels are highlighted by using a different color associated with the bonus payline symbols than the color or colors associated with the other symbols on the reels. It should be appreciated that any suitable color, shape, symbol or image may be employed in a game to indicate or otherwise identify the bonus payline symbols indicated on the reels in a spin. In a further embodiment, the bonus payline symbols indicated on the reels may be highlighted by illuminating the symbols with a plurality of different colors to indicate winner or loser bonus payline symbols or a bonus activator or de-activator symbol as described above. It should be appreciated that any suitable highlighting method may be employed to indicate or identify the bonus payline symbols on the reels in a game.

In another embodiment, the symbols on the reels include one or more bonus payline symbols that are randomly generated on the reels after the reels are activated. In this embodiment, the gaming device or player spins the reels to indicate symbols on the reels. After the reels stop spinning, the gaming device randomly generates zero, one or a plurality of bonus payline symbols on the reels. The bonus payline symbols, which are randomly generated on the reels, form the bonus payline for that spin.

For example referring to FIG. 9, the gaming device or player first activates or spins the reels and indicates the symbols shown on the reels. The gaming device then randomly generates the bonus payline symbols on the reels such as the highlighted symbols 700*a*, 700*b*, 700*c* and 700*d*. These symbols then form the bonus payline in this spin. It should be appreciated that the bonus payline symbols may be randomly generated in each spin of the reels or in a plurality of spins of the reels in a game. Additionally, the bonus payline symbols may also be randomly generated in a predetermined or designated number of spins of the reels such as the first five spins of the reels in a game. Furthermore in one aspect of this embodiment, the number of bonus payline symbols randomly generated in a spin is a predetermined or pre-designated number of bonus payline symbols. For example, a gaming device may only randomly generate up to four bonus payline symbols in a spin.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a display device;

an input device;

a processor; and a memory device which stores a plurality of instructions, which when executed by the processor, cause the processor to operate with the display device and the input device to:

(a) provide a play of a game upon a wager by a player, the game including:

(i) a plurality of symbols, the symbols including a plurality of bonus symbols, (ii) a plurality of different winning symbol combinations, each winning symbol combination including a designated plurality of the symbols displayed in a designated order in designated symbol positions, and (iii) a plurality of awards associated with the winning symbol combinations;

(b) cause a random generation of a plurality of the symbols;

(c) cause a display of the generated symbols at a plurality of designated symbol positions arranged in a predefined configuration;

(d) evaluate the symbols displayed at the plurality of designated symbol positions to determine if the symbols displayed at the designated symbol positions form any of the winning symbol combinations;

(e) for each winning symbol combination displayed at the designated symbol positions:

(i) cause a display of the award associated with said winning symbol combination, and (ii) cause said displayed award to be provided to the player;

(f) additionally evaluate any displayed bonus symbols to determine if the displayed bonus symbols form any of the winning symbol combinations; and (g) if the displayed bonus symbols form any of the winning symbol combinations:

(i) cause a display of a bonus award, said bonus award being based, at least in part, on the award associated with said winning symbol combination, and (ii) cause said displayed bonus award be provided to the player.

2. The gaming system of claim 1, wherein the quantity of bonus symbols randomly generated is based, at least in part, on an amount of the wager made by the player for the play of the game.

3. The gaming system of claim 1, wherein the symbols include at least one modifier symbol and if the modifier symbol is displayed, the plurality of instructions, when executed by the processor, cause the processor to base the bonus award, at least in part, on the displayed modifier symbol.

4. The gaming system of claim 1, which includes at least one bonus modifier, wherein the plurality of instructions, when executed by the processor, cause the processor to base the bonus award, at least in part, on the bonus modifier.

5. The gaming system of claim 4, wherein the bonus modifier is based, at least in part, on the number of displayed bonus symbols.

6. The gaming system of claim 4, wherein the bonus modifier is based, at least in part, on an amount of the wager made by the player for the play of the game.

7. The gaming system of claim 1, wherein the symbols include at least one bonus game triggering symbol.

8. The gaming system of claim 1, wherein the plurality of instructions, when executed by the processor, cause the processor to cause an additional display of the bonus symbols separately from the symbols displayed at the designated symbol positions.

9. A gaming system comprising:

a display device;

an input device;

a processor; and a memory device which stores a plurality of instructions, which when executed by the processor, cause the processor to operate with the display device and the input device to:

(a) provide a play of a game upon a wager by a player, the game including:

(i) a plurality of symbols, the symbols including a plurality of bonus symbols, (ii) a plurality of different winning symbol combinations, and (iii) a plurality of awards associated with the winning symbol combinations;

(b) cause a random generation of a plurality of the symbols;

(c) cause a display of the generated symbols;

(d) evaluate the symbols displayed at a plurality of designated symbol positions to determine if the symbols displayed at the designated symbol positions form any of the winning symbol combinations;

(e) for each winning symbol combination formed by the symbols displayed at the designated symbol positions:

(i) cause a display of the award associated with said winning symbol combination, and (ii) cause said displayed award be provided to the player; and (f) if any bonus symbols are displayed:

(i) form a designated payline, (ii) cause a display of said bonus symbols on the formed designated payline, (iii) evaluate the bonus symbols displayed on the designated payline to determine if said bonus symbols form any of the winning symbol combinations, and (iv) if the bonus symbols displayed on the designated payline form any of the winning symbol combinations:

(A) cause a display of a bonus award, said bonus award being based, at least in part, on the award associated with said winning symbol combination, and (B) cause said displayed bonus award be provided to the player.

10. The gaming system of claim 9, wherein the quantity of bonus symbols randomly generated is based, at least in part, on an amount of the wager made by the player for the play of the game.

11. The gaming system of claim 9, wherein the symbols include at least one modifier symbol and if the modifier symbol is displayed, the plurality of instructions, when executed by the processor, cause the processor to base the bonus award, at least in part, on the displayed modifier symbol.

12. The gaming system of claim 9, which includes at least one bonus modifier, wherein the plurality of instructions, when executed by the processor, cause the processor to base the bonus award, at least in part, on the bonus modifier.

13. The gaming system of claim 12, wherein the bonus modifier is based, at least in part, on the number of displayed bonus symbols.

14. The gaming system of claim 12, wherein the bonus modifier is based, at least in part, on an amount of the wager made by the player for the play of the game.

15. The gaming system of claim 9, wherein the symbols include at least one bonus game triggering symbol.

16. The gaming system of claim 9, wherein the plurality of instructions, when executed by the processor, cause the processor to cause a display of an additional designated payline and the bonus symbols separately from the symbols displayed at the designated symbol positions.

17. The gaming system of claim 9, wherein if a plurality of bonus symbols are displayed, the plurality of instructions, when executed by the processor, cause the processor to:

(A) form a plurality of designated paylines, (B) cause a display of at least a first of the displayed bonus symbols on a first of the formed designated paylines, (C) cause a display of at least a second of the displayed bonus symbols on a second of the formed designated paylines, and (D) for each designated payline:

(i) evaluate the bonus symbols displayed on the designated payline to determine if said bonus symbols form any of the winning symbol combinations, and (ii) cause a display of a bonus award to the player if the bonus symbols displayed on the designated payline form any of the winning symbol combinations, said bonus award being based, at least in part, on the award associated with said winning symbol combination.

18. A method of operating a gaming system, said method comprising:

(a) providing a play of a game upon a wager by a player, the game including:

(i) a plurality of symbols, the symbols including a plurality of bonus symbols, (ii) a plurality of different winning symbol combinations, each winning symbol combination including a designated plurality of the symbols displayed in a designated order in designated symbol positions, and (iii) a plurality of awards associated with the winning symbol combinations;

(b) causing a random generation of a plurality of the symbols;

(c) displaying the generated symbols at a plurality of designated symbol positions arranged in a predefined configuration;

(d) evaluating the symbols displayed at the plurality of designated symbol positions to determine if the symbols displayed at the designated symbol positions form any of the winning symbol combinations;

(e) for each winning symbol combination displayed at the designated symbol positions, displaying and providing to the player the award associated with said winning symbol combination;

(f) additionally evaluating any displayed bonus symbols to determine if the displayed bonus symbols form any of the winning symbol combinations; and (g) if the displayed bonus symbols form any of the winning symbol combinations, displaying and providing a bonus award to the player, said bonus award being based, at least in part, on the award associated with said winning symbol combination.

19. The method of claim 18, wherein the quantity of bonus symbols randomly generated is based, at least in part, on an amount of the wager made by the player for the play of the game.

20. The method of claim 18, which includes basing the bonus award, at least in part, on a displayed modifier symbol, if at least one modifier symbol is displayed.

21. The method of claim 18, which includes basing the bonus award, at least in part, on at least one bonus modifier.

22. The method of claim 21, wherein the bonus modifier is based, at least in part, on the number of displayed bonus symbols.

23. The method of claim 21, wherein the bonus modifier is based, at least in part, on an amount of the wager made by the player for the play of the game.

24. The method of claim 18, wherein the symbols include at least one bonus game triggering symbol.

25. The method of claim 18, which includes additionally displaying the bonus symbols separately from the symbols displayed at the designated symbol positions.

26. The method of claim 18, which is operated via a data network.

27. The method of claim 26, wherein the data network is an internet.

28. A method of operating a gaming system, said method comprising:

(a) providing a play of a game upon a wager by a player, the game including:

(i) a plurality of symbols, the symbols including a plurality of bonus symbols, (ii) a plurality of winning symbol combinations, and (iii) a plurality of awards associated with the winning symbol combinations;

(b) causing a random generation of a plurality of the symbols;

(c) displaying the generated symbols;

(d) evaluating the symbols displayed at a plurality of designated symbol positions to determine if the symbols displayed at the designated symbol positions form any of the winning symbol combinations;

(e) for each winning symbol combination formed by the symbols displayed at the designated symbol positions, displaying and providing to the player the award associated with said winning symbol combination; and (f) if any bonus symbols are displayed:

(i) forming a designated payline, (ii) displaying said bonus symbols on the formed designated payline, (iii) evaluating the bonus symbols displayed on the designated payline to determine if said bonus symbols form any of the winning symbol combinations, and (iv) if the bonus symbols displayed on the designated payline form any of the winning symbol combinations, displaying and providing a bonus award to the player, said bonus award being based, at least in part, on the award associated with said winning symbol combination.

29. The method of claim 28, wherein the quantity of bonus symbols randomly generated is based, at least in part, on an amount of the wager made by the player for the play of the game.

30. The method of claim 28, which includes basing the bonus award, at least in part, on a modifier symbol if at least one modifier symbol is displayed.

31. The method of claim 28, which basing the bonus award, at least in part, on at least one bonus modifier.

32. The method of claim 31, wherein the bonus modifier is based, at least in part, on the number of displayed bonus symbols.

33. The method of claim 31, wherein the bonus modifier is based, at least in part, on an amount of the wager made by the player for the play of the game.

34. The method of claim 28, wherein the symbols include at least one bonus game triggering symbol.

35. The method of claim 28, which includes additionally displaying the designated payline and the bonus symbols separately from the symbols displayed at the designated symbol positions.

36. The method of claim 28, which includes, if a plurality of bonus symbols are displayed:

(A) forming a plurality of designated paylines if, (B) displaying at least a first of the displayed bonus symbols on a first of the formed designated paylines, (C) displaying at least a second of the displayed bonus symbols on a second of the formed designated paylines, and (D) for each designated payline:

(i) evaluating the bonus symbols displayed on the designated payline to determine if said bonus symbols form any of the winning symbol combinations, and (ii) displaying and providing a bonus award to the player if the bonus symbols displayed on the designated payline form any of the winning symbol combinations, said bonus award being based, at least in part, on the award associated with said winning symbol combination.

37. The method of claim 28, which is operated via a data network.

38. The method of claim 37, wherein the data network is an internet.

* * * * *